(12) United States Patent
Sugiura

(10) Patent No.: US 7,199,932 B2
(45) Date of Patent: Apr. 3, 2007

(54) PRISM SHEET, ILLUMINATING DEVICE, SURFACE EMITTING DEVICE, AND LIQUID CRYSTAL DISPLAY DEVICE

(75) Inventor: Takuro Sugiura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 65 days.

(21) Appl. No.: 10/999,588

(22) Filed: Nov. 30, 2004

(65) Prior Publication Data
US 2005/0122745 A1 Jun. 9, 2005

(30) Foreign Application Priority Data
Dec. 5, 2003 (JP) .............................. 2003-407392

(51) Int. Cl.
G02B 27/10 (2006.01)
G02B 27/14 (2006.01)
G02B 27/12 (2006.01)

(52) U.S. Cl. ...................... 359/625; 359/626; 359/627; 359/638; 359/640

(58) Field of Classification Search ................ 359/625, 359/626, 627, 628, 640, 638
See application file for complete search history.

(56) References Cited
U.S. PATENT DOCUMENTS
6,222,689 B1 4/2001 Higuchi et al.

2003/0169586 A1 9/2003 Miyashita et al.
2004/0061812 A1* 4/2004 Maeda ........................ 349/65

FOREIGN PATENT DOCUMENTS
JP H2-84618 3/1990
JP 2003177406 6/2003

* cited by examiner

Primary Examiner—Alicia Harrington
Assistant Examiner—Brandi Thomas
(74) Attorney, Agent, or Firm—Brinks Hofer Gilson & Lione

(57) ABSTRACT

A surface emitting device includes a light guiding plate, a light source, and a prism sheet. The light guiding plate is provided with prism portions each having a slight inclined plane and a steep inclined plane arranged closer to one edge than the slight inclined plane. A plurality of light refracting portions each having a refractive surface and a reflective surface are provided on an incident surface of the prism sheet. Light introduced into the light guiding plate from the light source is emitted from the slight inclined plane and is then incident on the light refracting portion. The light is introduced into the prism sheet by the refracting surface and is then reflected from the reflective surface to be emitted.

14 Claims, 14 Drawing Sheets

PRISM SHEET, ILLUMINATING DEVICE, SURFACE EMITTING DEVICE, AND LIQUID CRYSTAL DISPLAY DEVICE

This application claims the benefit of priority to Japanese Patent Application No. 2003-407392, filed on Dec. 5, 2003, herein incorporated by reference.

BACKGROUND OF THE INVENTION

1. Field of the Invention

The present invention relates to a prism sheet, an illuminating device, a surface emitting device, and a liquid crystal display device.

2. Description of the Related Art

Conventionally, a backlight device, which is a kind of surface emitting device, for emitting light from the rear side of a liquid crystal display panel to a display surface has been commonly used as an illuminating means of the liquid crystal display device. In general, the conventional backlight device includes a light guiding plate composed of a transparent resin plate having one edge, an emission surface orthogonal to the one edge, and a prism surface provided opposite to the emission surface; a light source arranged at the side of the one edge of the light guiding plate; a prism sheet arranged at the side of the emission surface of the light guiding plate.

In the conventional backlight device, light emitted from the light source is introduced into the light guiding plate through the one edge and is then reflected from the prism surface. Then, the reflected light is emitted from the emission surface, and the emitted light is reflected in the same direction by the prism sheet and is then emitted from the entire surface of the prism sheet. As an example of such a backlight device, a surface emitting device disclosed in Japanese Examined Patent Application Publication No. 7-27137 has been commonly known.

In the surface emitting device disclosed in the above publication, as shown in FIG. 1 of the above publication, light components emitted from a light guiding plate travel in different directions and are emitted in a dispersed state. In this publication, the dispersed light components travel in the same direction while passing through the prism sheet. However, since the prism sheet has limitations in allowing light components to travel in the same direction, it is difficult to sufficiently improve the directivity of light passing through the prism sheet.

SUMMARY OF THE INVENTION

Accordingly, the present invention is designed to solve the above-mentioned problem, and it is an object of the present invention to provide a surface emitting device having high light directivity, high brightness, and excellent brightness uniformity and a liquid crystal display device having the same. In addition, it is another object of the present invention to provide a prism sheet and an illuminating device used in the surface emitting device.

In order to achieve the above objects, the present invention provides a prism sheet in which a plurality of rib-shaped light refracting portions each having a refractive surface and a reflective surface are consecutively provided on an incident surface of a transparent sheet, and an emission surface opposite to the incident surface is a flat surface, in which light obliquely incident on the transparent sheet is introduced into the transparent sheet by the refractive surface of each light refracting portion, and in which the incident light is reflected from the reflective surface inside the transparent sheet and is then emitted from the other surface of the transparent sheet.

According to the above-mentioned structure, it is possible to refract the incident light in a predetermined direction by the refractive surfaces and the reflective surfaces and to emit the light. In particular, the prism sheet can refract the incident light having high directivity with little dispersion.

Further, in the above-mentioned prism sheet of the present invention, when an incident angle of the incident light with respect to the normal direction of the emission surface is $\alpha$, an emission angle with respect to the emission surface is $\psi$, an inclination angle of the refractive surface with respect to the emission surface is $\theta_1$, an inclination angle of the reflective surface with respect to the emission surface is $\theta_2$, and a refractive index of the transparent sheet is N, the inclination angles $\theta_1$ and $\theta_2$ satisfy the following Expression 1.

$$\theta_2 = \tfrac{1}{2}[180 - \theta_1 - \sin^{-1}\{\sin(\alpha-\theta_1)/N\} - \sin^{-1}(\sin\psi/N)] \quad \text{[Expression 1]}$$

According to the above-mentioned structure, light incident at the incident angle $\alpha$ with respect to the normal direction of the emission surface can be emitted in the direction of the emission angle $\psi$.

Furthermore, in the above-mentioned prism sheet of the present invention, when an inclination angle of the refractive surface with respect to the emission surface is $\theta_1$, an inclination angle of the reflective surface with respect to the emission surface is $\theta_2$, an incident angle of the incident light with respect to the normal direction of the emission surface is $\alpha$, and the reflective index of the transparent sheet is N, the inclination angles $\theta_1$ and $\theta_2$ satisfy the following Expression 2.

$$\theta_2 = \tfrac{1}{2}[180 - \theta_1 - \sin^{-1}\{\sin(\alpha-\theta_1)/N\}] \quad \text{[Expression 2]}$$

According to the above-mentioned structure, light incident at the incident angle $\alpha$ with respect to the normal direction of the emission surface can be emitted in the normal direction of the emission surface.

In the above-mentioned prism sheet of the present invention, each light refracting portion has a top portion where the refractive surface meets the reflective surface, and a valley portion is formed between adjacent light refracting portions. In addition, when a height from the top portion to the valley portion is a height h of the light refracting portion and a height from the top portion to a point on a normal line with respect to the valley portion of the transparent sheet where the incident light passes is H, H<h is satisfied.

According to the above-mentioned structure, it is possible to increase the quantity of light that is incident on the refractive surface and is then reflected from the reflective surface and thus to improve the brightness of emission light.

Moreover, the above-mentioned prism sheet of the present invention is the above-mentioned prism sheet, and a satin finish is performed on the emission surface.

According to the above-mentioned structure, it is possible to improve the brightness uniformity of light emitted from the emission surface.

Further, an illuminating device of the present invention comprises a light guiding plate; and a light source arranged in the vicinity of one edge of the light guiding plate, in which a plurality of rib-shaped prism portions each having a slight inclined plane and a steep inclined plane arranged closer to the one edge than the slight inclined plane are consecutively provided on one surface of the light guiding plate orthogonal to the one edge, and in which light emitted from the light source is introduced into the light guiding plate through the one edge.

According to the above-mentioned structure, the light introduced into the light guiding plate travels inside the light guiding plate while being alternatively reflected between the one surface and the other surface. When the light is incident on the slight inclined plane or the other surface at a predetermined threshold angle, the light is emitted from the slight inclined plane or the other surface to the outside of the light guiding plate. Light components emitted from the slight inclined planes and the other surface have different directions. However, at least in the direction opposite to the one edge, the light components travel at different angles with respect to the other surface. Therefore, the above-mentioned structure enables light emitted from the light source to travel in a predetermined direction. Thus, it is possible to improve the brightness of emission light.

Further, in the above-mentioned illuminating device of the present invention, the plurality of prism portions are also provided on the other surface opposite to the one surface of the light guiding plate.

According to the above-mentioned structure, the light introduced into the light guiding plate travels inside the light guiding plate while being alternatively reflected between the one surface and the other surface. When the light is incident on the slight inclined plane of the one surface or the other surface at a predetermined threshold angle, the light is emitted from the slight inclined plane to the outside of the light guiding plate. Light components emitted from the slight inclined planes have different directions. However, at least in the direction opposite to the one edge, the light components travel in the direction of a predetermined angle with respect to the other surface. Therefore, the above-mentioned structure enables light emitted from the light source to travel in a predetermined direction. Thus, it is possible to improve the brightness of emission light.

Furthermore, in the above-mentioned illuminating device of the present invention, a reflective plate having a metallic glossy surface is provided on the other surface opposite to the one surface of the light guiding plate.

According to the above-mentioned structure, it is possible to specularly reflect light from the other surface inside the light guiding plate. Therefore, light can be emitted from only the slight inclined planes on the one surface, thereby improving the brightness of emission light.

Moreover, in the above-mentioned illuminating device of the present invention, a reflective plate having a metallic glossy surface is provided on the one surface of the light guiding plate. In this way, light emitted from the inside of the light guiding plate to the one surface is specularly reflected from the reflective plate and is then introduced into the light guiding plate again. Then, finally, the light is emitted from only the other surface of the light guiding plate. Therefore, it is possible to improve the brightness of emission light.

Further, in the above-mentioned illuminating device of the present invention, an inclination angle $\gamma_1$ of the steep inclined plane with respect to the one surface and/or the other surface is set in the range of 20° to 90°, and an inclination angle $\gamma_2$ of the slight inclined plane with respect to the one surface and/or the other surface is set in the range of 0.5° to 5°.

According to the above-mentioned structure, light introduced into the light guiding plate can be efficiently emitted from the slight inclined planes.

Furthermore, a surface emitting device of the present invention comprises a light guiding plate; a light source arranged in the vicinity of one edge of the light guiding plate; and a prism sheet composed of a transparent sheet and arranged on one surface of the light guiding plate orthogonal to the one edge. In the surface emitting device, a plurality of rib-shaped prism portions each having a slight inclined plane and a steep inclined plane arranged closer to the one edge than the slight inclined plane are consecutively provided on the one surface and/or the other surface of the light guiding plate. In addition, a plurality of rib-shaped light refracting portions each having a refractive surface and a reflecting surface are consecutively provided on an incident surface of the prism sheet facing the light guiding plate, and an emission surface opposite to the incident surface is a flat surface. Further, the prism sheet is arranged on the light guiding plate with the refractive surfaces facing the light source. Furthermore, light introduced into the light guiding plate from the light source through the one edge is emitted from the slight inclined plane and is then incident on the light refracting portion, and the light incident on the light refracting portion is introduced into the transparent sheet by the refractive surface and is then refracted from the reflective surface in the transparent sheet to be emitted from the emission surface.

According to the above-mentioned structure, light components emitted from the light source travel in the same direction while passing through the slight inclined planes, and the light components are refracted in a predetermined direction by the prism sheet. In this way, it is possible to emit light having high brightness, excellent brightness uniformity, and high directivity from the emission surface of the prism sheet.

Further, in the above-mentioned surface emitting device of the present invention, when an incident angle of the incident light with respect to the normal direction of the emission surface of the prism sheet is α, an emission angle with respect to the emission surface is ψ, an inclination angle of the refractive surface with respect to the emission surface is $\theta_1$, an inclination angle of the reflective surface with respect to the emission surface is $\theta_2$, and a refractive index of the transparent sheet is N, the inclination angles $\theta_1$, and $\theta_2$ satisfy the following Expression 3.

$$\theta_2 = \tfrac{1}{2}[180 - \theta_1 - \sin^{-1}\{\sin(\alpha-\theta_1)/N\} - \sin^{-1}(\sin\psi/N)] \quad \text{[Expression 3]}$$

According to the above-mentioned structure, light emitted from the light guiding plate at the angle α with respect to the normal direction of the emission surface can be emitted in the direction of the emission angle ψ.

In the above-mentioned surface emitting device of the present invention, when an inclination angle of the refractive surface with respect to the emission surface of the prism sheet is $\theta_1$, an inclination angle of the reflective surface with respect to the emission surface thereof is $\theta_2$, an emission angle of light emitted from the light guiding plate with respect to the normal direction of the emission surface is α, and a refractive index of the transparent sheet is N, the inclination angles $\theta_1$ and $\theta_2$ satisfy the following Expression 4.

$$\theta_2 = \tfrac{1}{2}[180 - \theta_1 - \sin^{-1}\{\sin(\alpha-\theta_1)/N\}] \quad \text{[Expression 4]}$$

According to the above-mentioned structure, light emitted from the light guiding plate at the angle α with respect to the normal direction of the emission surface can be emitted in the normal direction of the emission surface.

Furthermore, in the above-mentioned surface emitting device of the present invention, each light refracting portion has a top portion where the refractive surface meets the reflective surface, and a valley portion is formed between adjacent light refracting portions. In addition, when a height from the top portion to the valley portion is a height h of the light refracting portion and a height from the top portion to a point on a normal line with respect to the valley portion of the transparent sheet where the incident light passes is H, H<h is satisfied.

According to the above-mentioned structure, it is possible to increase the quantity of light that is incident on the refractive surface and is then reflected from the reflective surface. Thus, it is possible to improve the brightness of light emitted from the surface emitting device.

Moreover, in the above-mentioned surface emitting device of the present invention, a reflective plate having a metallic glossy surface is provided on the other surface opposite to the one surface of the light guiding plate.

In this way, it is possible to specularly reflect light from the other surface inside the light guiding plate. Therefore, light can be emitted from only the slight inclined planes on the one surface. Thus, it is possible to improve the brightness of light emitted from the surface emitting device.

Further, in the surface emitting device of the present invention, a reflective plate having a metallic glossy surface is provided on the one surface of the light guiding plate. In this way, light emitted from the inside of the light guiding plate to the one surface is specularly reflected from the reflective plate and is then introduced into the light guiding plate again. Then, finally, the light is emitted from only the other surface of the light guiding plate. Therefore, it is possible to improve the brightness of emission light.

Further, in the above-mentioned surface emitting device of the present invention, an inclination angle $\gamma_1$ of the steep inclined plane with respect to the one surface and/or the other surface is set in the range of 20° to 90°, and an inclination angle $\gamma_2$ of the slight inclined plane with respect to the one surface and/or the other surface is set in the range of 0.5° to 5°.

According to the above-mentioned structure, light introduced into the light guiding plate can be efficiently emitted from the slight inclined planes. Thus, it is possible to improve the brightness of light emitted from the surface emitting device.

Furthermore, in the above-mentioned surface emitting device of the present invention, a satin finish is performed on the emission surface.

According to the above-mentioned structure, it is possible to improve the brightness uniformity of light emitted from the emission surface of the prism sheet.

Moreover, a liquid crystal display device of the present invention comprises a liquid crystal panel in which a liquid crystal layer is interposed between a pair of substrates; and the above-mentioned surface emitting device. In the liquid crystal display device, the liquid crystal display panel is arranged such that a rear surface thereof faces a prism sheet of the surface emitting device.

According to the above-mentioned structure, the liquid crystal display device is provided with the surface emitting device capable of emitting light having high brightness and excellent brightness uniformity. Therefore, it is possible to obtain bright display without brightness irregularity.

As described above, the prism sheet of the present invention can refract light having high directivity without dispersion. In addition, according to the illuminating device of the present invention, it is possible to emit light having high directivity. Further, the surface emitting device of the present invention can emit light having high brightness and excellent brightness uniformity from the entire surface of the emission surface. Furthermore, the liquid crystal display device of the present invention can display a bright image without brightness irregularity.

DESCRIPTION OF THE PREFERRED EMBODIMENT

Hereinafter, preferred embodiments of the present invention will be described with reference to the accompanying drawings. In each figure used for explaining the structure of the present invention, the size, thickness, and dimension of each unit shown in each figure may be different from actual size, thickness, and dimension thereof.

First Embodiment

Figure 1:
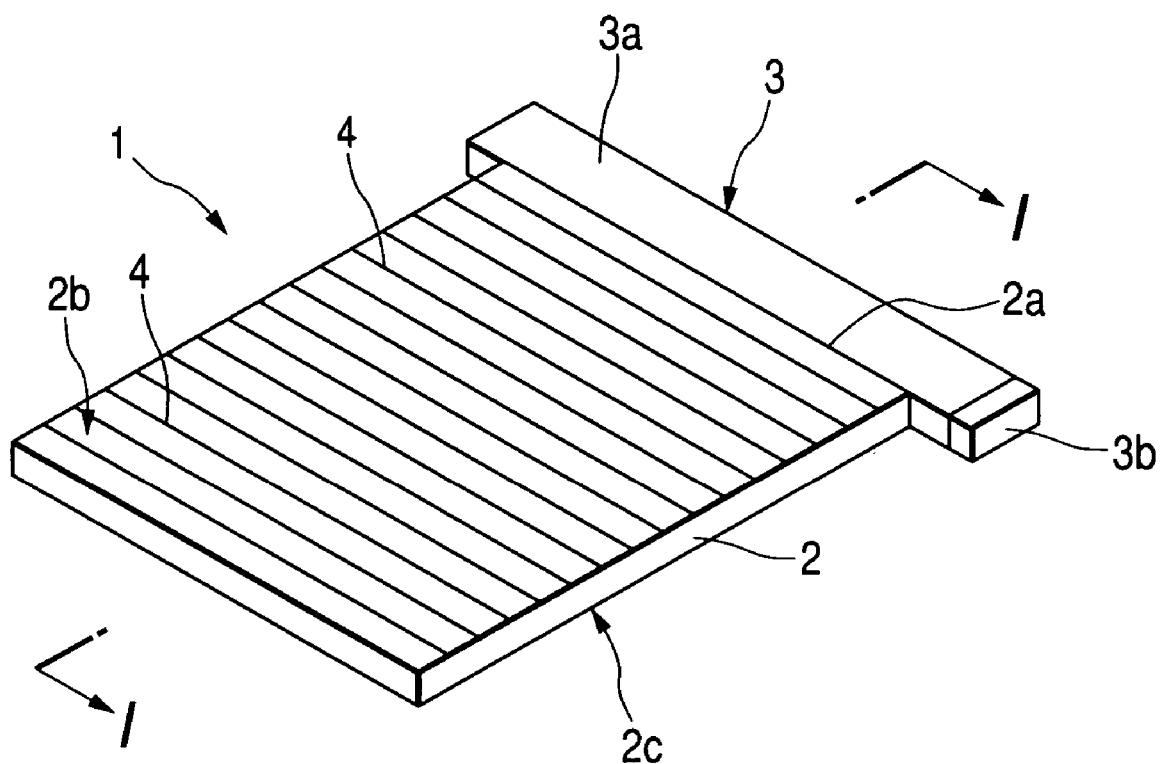
FIG. 1 is a perspective view illustrating an illuminating device according to a first embodiment of the present invention.
Figure 2:
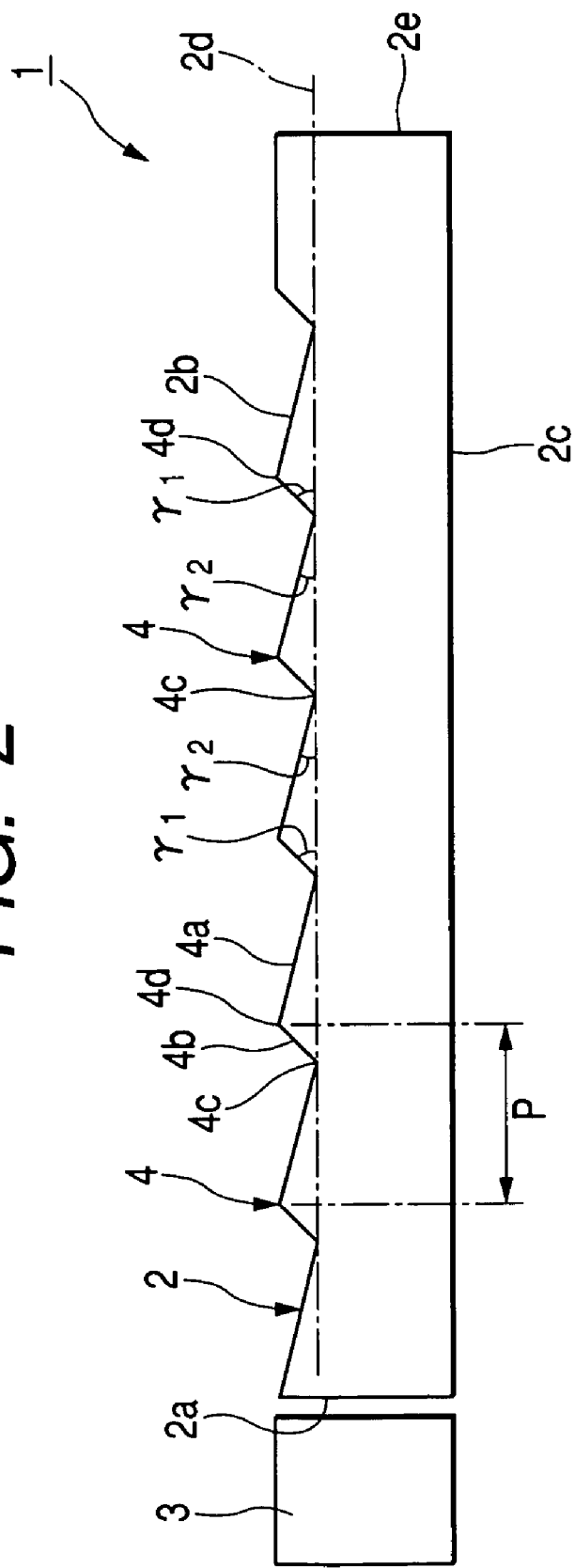
FIG. 2 is a cross-sectional view schematically illustrating the illuminating device according to the first embodiment of the present invention.
Figure 3:
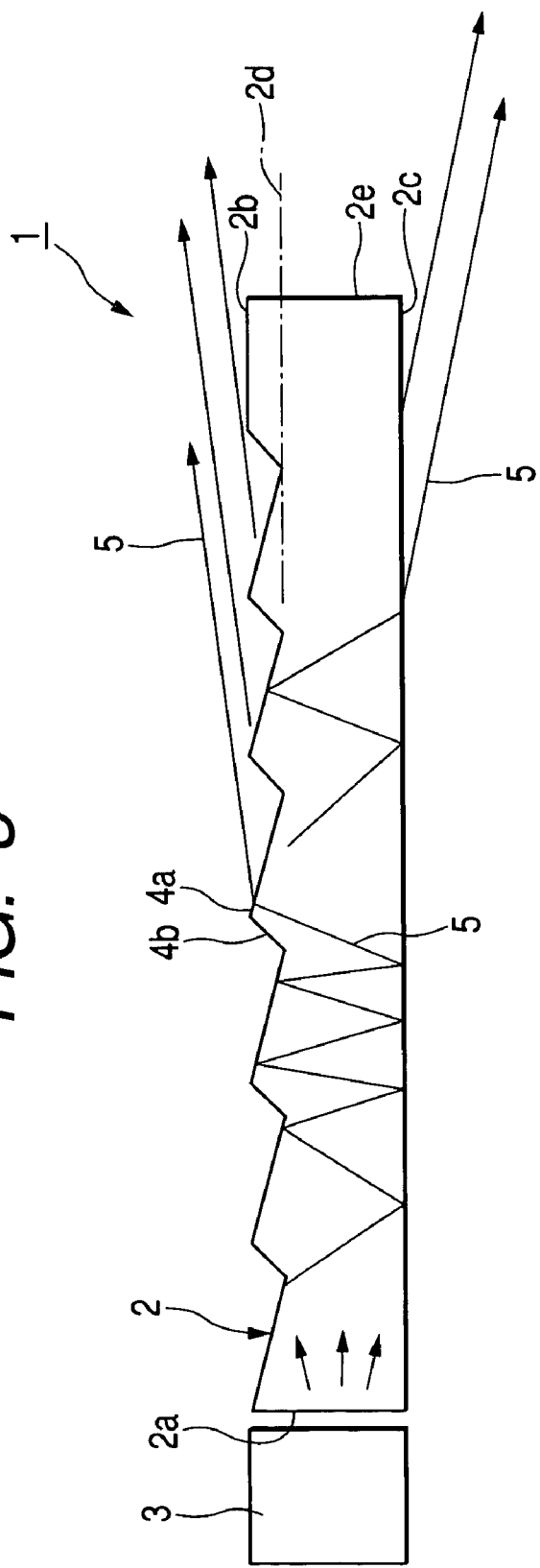
FIG. 3 is a schematic view illustrating the traveling direction of light introduced into a light guiding plate of the illuminating device according to the first embodiment of the present invention.

An illuminating device according to a first embodiment of the present invention will be described with reference to the drawings. FIG. 1 is a perspective view of the illuminating device according to the present embodiment, and FIG. 2 is a cross-sectional view schematically illustrating the illuminating device according to the present embodiment. FIG. 3 is a view schematically illustrating the traveling direction of light introduced into a light guiding plate.

As shown in FIGS. 1 and 2, an illuminating device 1 mainly comprises a transparent light guiding plate 2 and a light source device (light source) 3. The light source device 3 is provided at the side of one edge 2a of the light guiding plate 2 through which light is introduced. In addition, the light guiding plate 2 is composed of a transparent plate, such as an acrylic resin plate. Light emitted from the light source device 3 provided at the side of the one edge 2a is introduced into the light guiding plate 2 through the one edge 2a.

Further, as shown in FIGS. 1 and 2, a plurality of rib-shaped prism portions 4 is provided on one surface 2b of the light guiding plate 2 (an upper surface of the light guiding plate in FIG. 1) orthogonal to the one edge 2a. The plurality of prism portions 4 are arranged in stripe shapes at predetermined pitches. In addition, the other surface 2c opposite to the one surface 2b is a flat surface.

As shown in FIG. 2, the prism portion 4 has a slight inclined plane 4a and a steep inclined plane 4b arranged closer to the one edge 2a than the slight inclined plane 4a. The prism portion 4 has an asymmetric structure composed of the slight inclined plane 4a and the steep inclined plane 4b having an inclination angle larger than that of the slight inclined plane 4a, and the direction in which each prism portion 4 is formed is parallel to the one edge 2a of the light guiding plate 2. In addition, the respective prism portions 4 are connected to each other such that the slight inclined plane 4a of a prism portion 4 is adjacent to the steep inclined plane 4b of the next prism portion 4 to form a valley portion 4c. Further, the prism portion 4 has a top portion 4d where the slight inclined plane 4a meets the steep inclined plane 4b.

An inclination angle $\gamma_1$ of the steep inclined plane 4b is set in the range of 20° to 90° with respect to a reference surface 2d of the surface 2b, and an inclination angle $\gamma_2$ of the slight inclined plane 4a is set in the range of 0.5° to 5° with respect to the reference surface 2d. In addition, a pitch P between the prism portions 4 is set in the range of 0.05 to 0.5 mm. The larger the pitch P is, the larger brightness when a prism sheet is superposed becomes, as will be described later. Further, the smaller the inclination angle $\gamma_2$ of the slight inclined plane becomes, the more uniform the brightness when the prism sheet is superposed becomes.

Furthermore, the light guiding plate 2 can be made of a transparent resin material, such as a polycarbonate-based resin or epoxy resin, or glass in addition to the acryl-based resin. In addition, the refractive index of the light guiding plate is preferably in the range of 1.40 to 1.60.

The light source device 3 is provided in the vicinity of the one edge 2a of the light guiding plate 2. As shown in FIG. 1, the light source device 3 comprises a bar light guiding body 3a adjacent to the light guiding plate 2 and a light emitting device 3b, such as an LED, mounted at one end of the bar light guiding body 3a. In the light source device 3, light emitted from the light emitting device 3b is refracted toward the light guiding plate 2 while traveling inside the bar light guiding body 3a, so that light emitted from the light emitting device 3b is incident on the one edge 2a of the light guiding plate 2 from the bar light guiding body 3a.

As shown in FIG. 3, light emitted from the light source device 3 to the light guiding plate 2 is introduced into the light guiding plate 2 through the one edge 2a. In FIG. 3, reference numeral '5' indicates a traveling path of light traveling inside the light guiding plate 2. The light 5 emitted from the light source device 3 travels toward the other edge 2e opposite to the one edge 2a inside the light guiding plate 2 while being reflected between the one surface 2b and the other surface 2c of the light guiding plate 2. When some of light components are incident on the slight inclined plane 4a at a predetermined threshold angle, the light components are emitted from the slight inclined plane 4a. Similarly, other light components are also emitted from the other surface 2c of the light guiding plate 2. The emitted light components travel in the direction of a predetermined angle with respect to the reference surface 2d of the light guiding plate 2. That is, light components incident on the light guiding plate 2 from the light emitting device 3 travel in different directions, but the light components are reflected in the same direction while traveling inside the light guiding plate 2. Thus, when the light components are emitted from the slight inclined planes 4a and the other surface 2c, the light components travel substantially in the same direction.

The traveling path of light inside the light guiding plate 2 depends on the inclination angle $\gamma_2$ of the slight inclined plane 4a, the inclination angle $\gamma_1$ of the steep inclined plane 4b, and the pitch P between the prism portions 4. Therefore, it is possible to adjust the emitting direction of light from the slight inclined planes 4a and the other surface 2c by appropriately setting the inclination angles $\gamma_1$ and $\gamma_2$ and the pitch P.

(Experiment 1)

The light guiding plate 2 is composed of a transparent acryl plate having a length of 50 mm, a width of 66 mm, and a thickness of 1.0 mm, and the inclination angle of the slight inclined plane 4a is set to 2.3°. In addition, the inclination angle of the steep inclined plane 4b is set to 43°, and the pitch P is set to 0.18 mm. Further, the light source device 3 is constructed by mounting two LEDs (light emitting devices) having a rated current of 10 mA to both ends of the bar light guiding body. An illuminating device of experiment 1 is manufacture by mounting the light source device 3 at the side of the one edge 2a of the light guiding plate 2.

Figure 4:
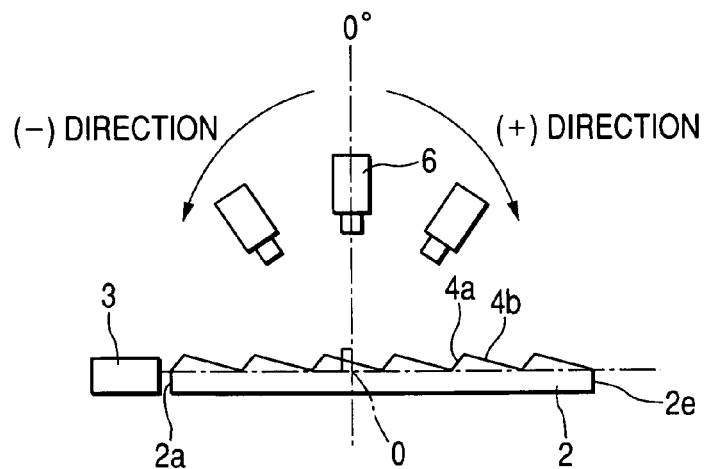
FIG. 4 is a schematic view illustrating the positional relationship between the illuminating device and a brightness measuring sensor in an experiment 1.

As shown in FIG. 4, in the illuminating device of the experiment 1, a brightness measuring sensor 6 is arranged substantially above the center of the light guiding plate 2. The brightness measuring sensor 6 can rotate on the center O of the light guiding plate 2 between the one edge 2a (the negative direction) and the other edge 2e (the positive direction) of the light guiding plate 2 in an arch shape.

Figure 5:
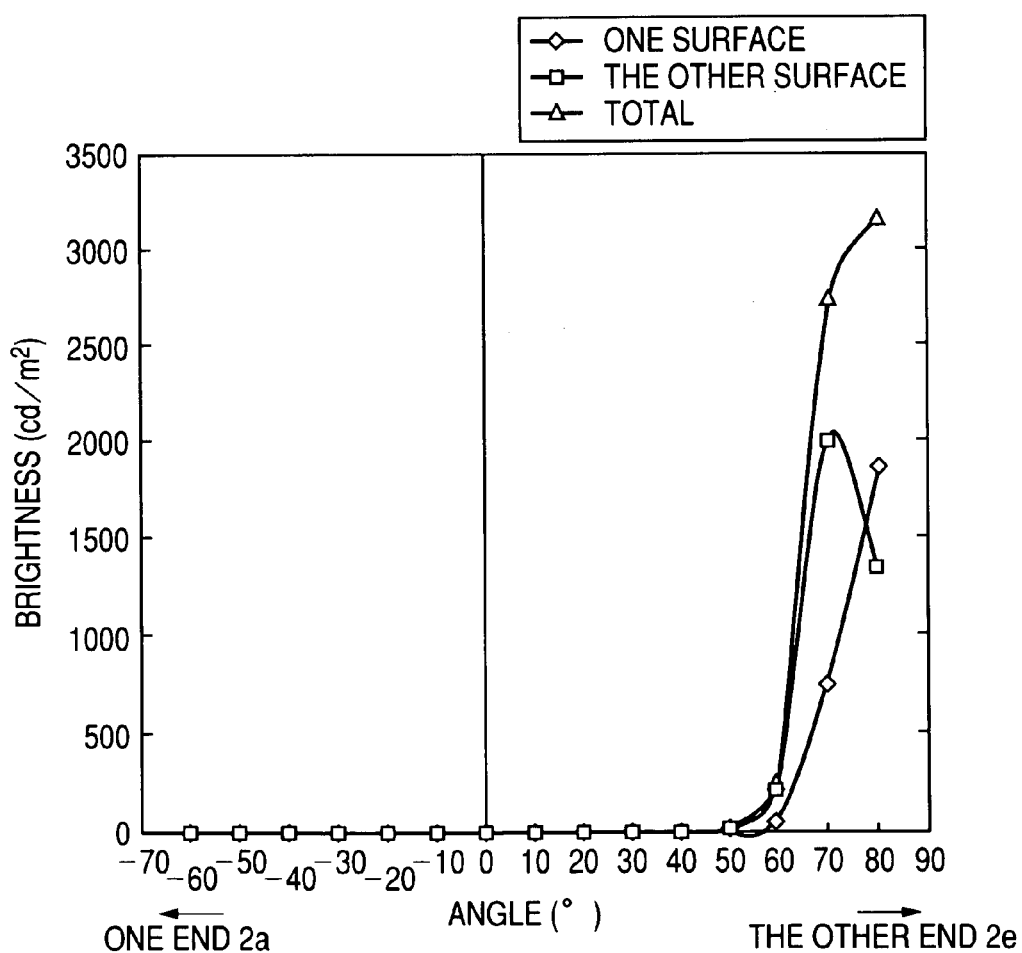
FIG. 5 is a graph illustrating the relationship between the angle of the illuminating device and the brightness of light emitted from the illuminating device in the experiment 1.

Then, after the illuminating device is operated, the intensity of light emitted from one surface of the light guiding plate is measured whenever the brightness measuring sensor moves from the positive direction to the negative direction by 10°. The measured results are shown in FIG. 5. In addition, the illuminating device is turned over, and the brightness measuring sensor is arranged above the other surface of the light guiding plate to measure brightness. The measured results are also shown in FIG. 5. Further, the total quantity of the brightness of the one surface and the brightness of the other surface is also shown in FIG. 5.

FIG. 5 is a graph illustrating the relationship between the inclination angle of the brightness measuring sensor with respect to the reference surface 2d of the light guiding plate 2 and the brightness of emission light. In FIG. 5, an angle 0° is a normal direction of the reference surface 2d of the light guiding plate 2. In FIG. 5, an angle where high brightness is obtained corresponds to an emission angle of emission light.

As can be seen from FIG. 5, light emitted from the one surface has increasing brightness at an angle of about +60° and has the maximum brightness at an angle of about +80°. In addition, no light is emitted in the normal direction of the reference surface 2d of the light guiding plate 2 and in the negative direction thereof. That is, it is understood that emission light from the one surface is emitted from the other edge 2e of the light guiding plate in an angle range of 10° to 30° with respect to the reference surface 2d of the light guiding plate.

Meanwhile, emission light from the other surface has increasing brightness at an angle of about +50° and has the maximum brightness at an angle of about +70°. In addition, no light is emitted in the normal direction of the reference surface 2d of the light guiding plate 2 and in the negative direction thereof. That is, it is understood that emission light from the other surface is emitted from the other edge 2e of the light guiding plate 2 in an angle range of 10° to 40° with respect to the reference surface 2d of the light guiding plate.

Further, the brightness of light emitted from the entire surface of the light guiding plate is a maximum of 3150 (cd/m$^2$), and thus high-brightness emission light is obtained. Therefore, when arranging a reflective sheet on the other surface, it is possible to emit light from only the one surface. This structure will be explained in the second embodiment to be described later.

As described above, according to the illuminating device 1 of the present embodiment, light incident on the light guiding plate 2 from the light source device 3 can be emitted from the reference surface 2d of the light guiding plate 2 in the direction of a predetermined angle with respect to the reference surface 2d.

Second Embodiment

Figure 6:
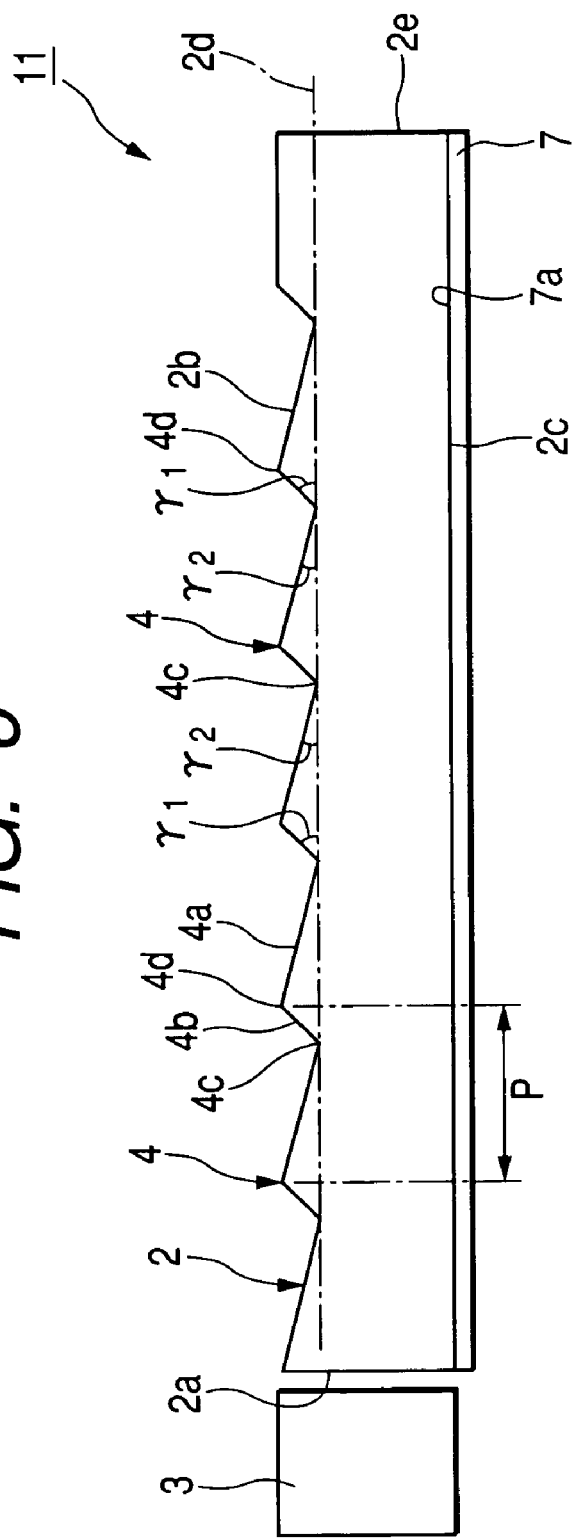
FIG. 6 is a cross-sectional view schematically illustrating an illuminating device according to a second embodiment of the present invention.
Figure 7:
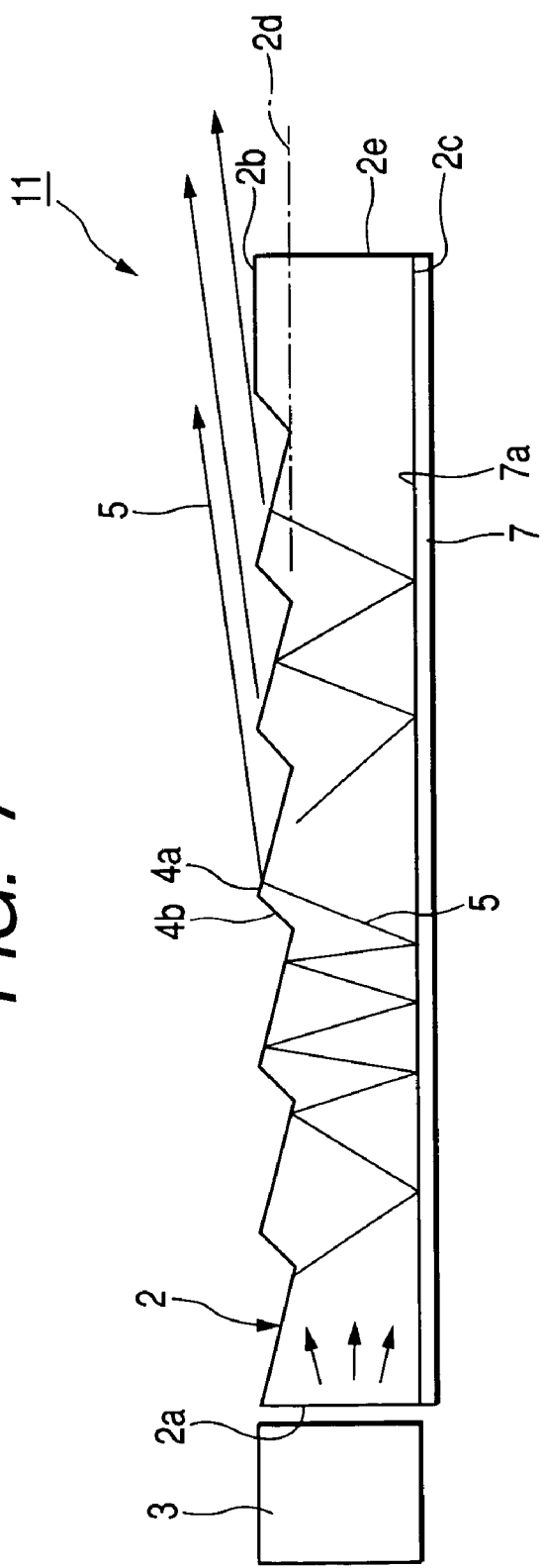
FIG. 7 is a schematic view illustrating the traveling direction of light introduced into a light guiding plate of the illuminating device according to the second embodiment of the present invention.

Next, a second embodiment of the present invention will be described with reference to the drawings. FIG. 6 is a cross-sectional view schematically illustrating an illuminating device of the present embodiment, and FIG. 7 is a schematic view illustrating the traveling direction of light introduced into the light guiding plate. In the illuminating device of the present embodiment shown in FIGS. 6 and 7, the same components as those in the first embodiment have the same reference numerals, and a description thereof will be omitted for simplicity of explanation.

As shown in FIG. 6, an illuminating device 11 comprises a transparent light guiding plate 2, the light source device (light source) 3, and a reflective plate 7 mounted on the light guiding plate 2. The light source device 3 is provided at the side of the one edge 2a of the light guiding plate 2 into which light is introduced. In addition, the light guiding plate 2 is composed of a transparent plate, such as an acrylic resin plate. Light emitted from the light source device 3 provided at the side of the one edge 2a is introduced into the light guiding plate 2 through the one edge 2a.

Further, as shown in FIGS. 1 and 2, the plurality of rib-shaped prism portions 4 having is provided on the one surface 2b (an upper surface of the light guiding plate in FIG. 1) orthogonal to the one edge 2a of the light guiding plate 2. The plurality of prism portions 4 are arranged in stripe shapes at predetermined pitches. In addition, the other surface 2c opposite to the one surface 2b is a flat surface.

The reflective plate 7 is arranged on the other surface 2c. The reflective plate 7 has a reflective surface 7a, which is a glossy surface, and the reflective surface 7a is bonded to the other surface 2c. The reflective plate 7 is made of a metallic material having a glossy property, such as aluminum or silver. The reflective plate 7 is bonded to the other surface 2c of the light guiding plate 2, so that light that travels inside the light guiding plate 2 and is then incident on the other surface 2c is specularly reflected from the reflective surface 7a.

As shown in FIG. 7, light emitted from the light source device 3 to the light guiding plate 2 is introduced into the light guiding plate 2 through the one edge 2a. In FIG. 7, reference numeral '5' indicates a traveling path of light traveling inside the light guiding plate 2. The light 5 emitted from the light source device 3 travels toward the other edge 2e opposite to the one edge 2a inside the light guiding plate 2 while being reflected between the one surface 2b and the other surface 2c of the light guiding plate 2. When some of light components are incident on the slight inclined planes 4a at a predetermined threshold angle, the light components are emitted from the slight inclined planes 4a.

Since the reflective plate 7 is bonded to the other surface 2c of the light guiding plate 2, light that travels inside the light guiding plate 2 and is then incident on the other surface 2c is always specularly reflected from the reflective surface 7a. Therefore, most of the light traveling inside the light guiding plate 2 is emitted from the one surface 2b, and no light is emitted from the other surface 2c. Therefore, it is possible to increase the brightness of light emitted from the one surface 2b.

The brightness of light emitted from the illuminating device of the present embodiment is measured in the same manner at that in the experiment 1 of the first embodiment. As the result of measurement, the same total brightness data as that in FIG. 5 is obtained. That is, it is expected that light emitted from the one surface have increasing brightness at an angle of about +60° and have the maximum brightness at an angle of about +80°. In addition, it is expected that no light be emitted in the normal direction of the reference surface 2d of the light guiding plate 2 and in the negative direction thereof. Therefore, it is expected that emission light from the one surface be emitted from the other edge 2e of the light guiding plate in an angle range of 10° to 30° with respect to the reference surface 2d of the light guiding plate.

Meanwhile, since all light components traveling inside the light guiding plate are specularly reflected from the reflective plate, it is expected that no light be emitted from the other surface.

Therefore, it is expected that light emitted from the entire surface of the light guiding plate have brightness equal to the maximum brightness of 3150 (cd/m$^2$) obtained from the entire surface of the light guiding plate in the experiment 1.

As such, according to the illuminating device 11 of the present embodiment, it is possible to specularly reflect light from the other surface 2c in the light guiding plate 2. Therefore, light can be emitted from only the slight inclined planes 4a of the one surface 2b, thereby increasing the brightness of emission light.

Third Embodiment

Figure 8:
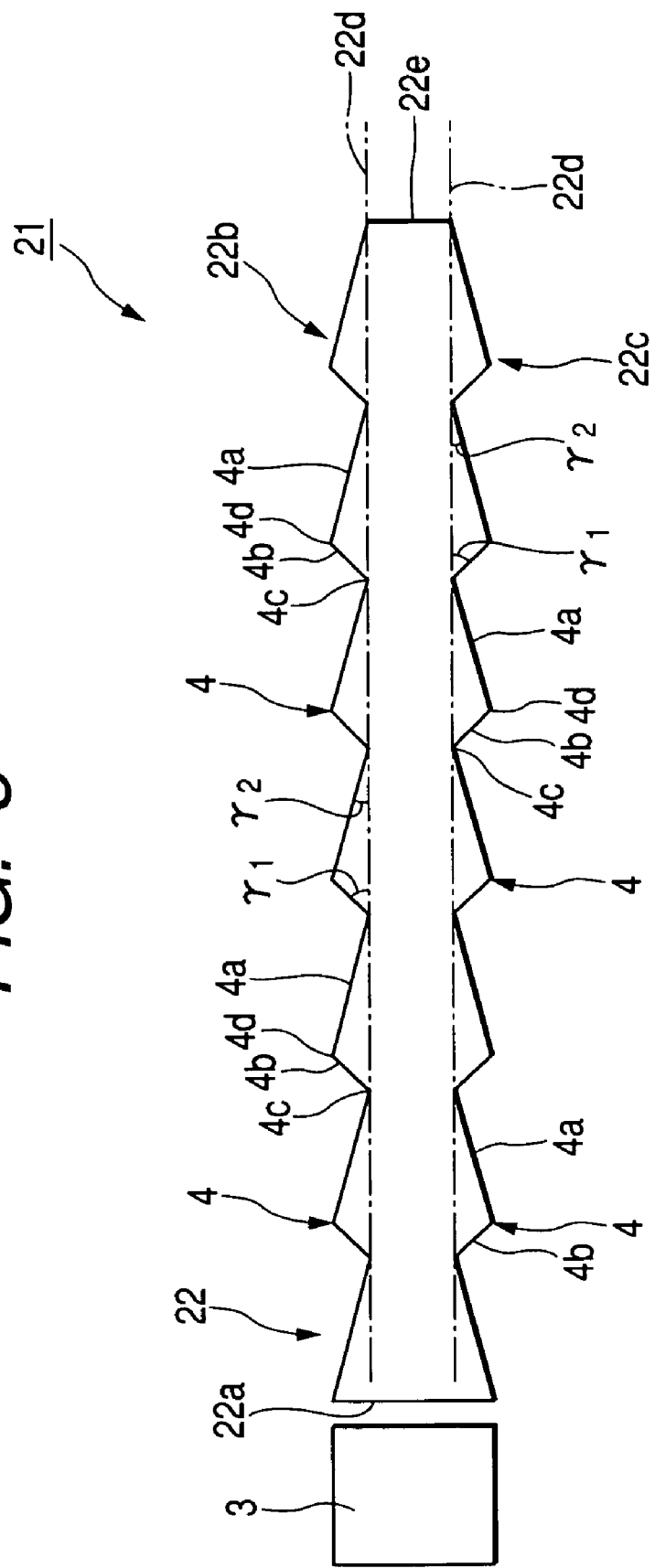
FIG. 8 is a cross-sectional view schematically illustrating an illuminating device according to a third embodiment of the present invention.
Figure 9:
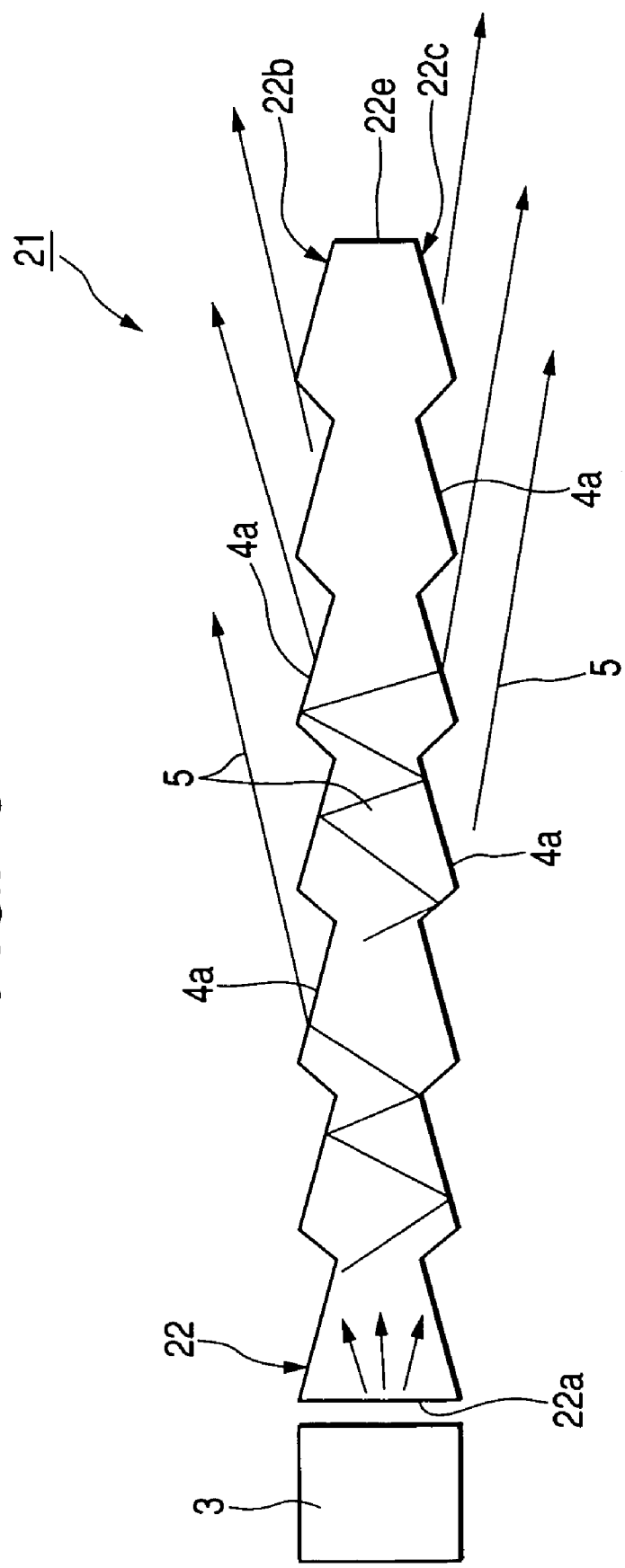
FIG. 9 is a schematic view illustrating the traveling direction of light introduced into a light guiding plate of the illuminating device according to the third embodiment of the present invention.

Next, an illuminating device according to a third embodiment of the present invention will be described with reference to the drawings. FIG. 8 is a cross-sectional view schematically illustrating an illuminating device according to the present embodiment, and FIG. 9 is a view schematically illustrating the traveling direction of light introduced into a light guiding plate. In addition, in the illuminating device of the present embodiment shown in FIGS. 8 and 9, the same components as those in the first embodiment have the same reference numerals, and a description thereof will be omitted for simplicity of explanation.

As shown in FIG. 8, an illuminating device 21 comprises a transparent light guiding plate 22 and the light source device (light source) 3. The light source device 3 is provided at the side of one edge 22a of the light guiding plate 22 through which light is introduced. In addition, the light guiding plate 22 is composed of a transparent plate, such as an acrylic resin plate. Light emitted from the light source device 3 provided at the side of the one edge 22a is introduced into the light guiding plate 22 through the one edge 22a.

Further, as shown in FIG. 8, a plurality of rib-shaped prism portions 4 are provided on both surfaces 22b and 22c (one surface 22b (an upper surface of the light guiding plate in FIG. 8) and the other surface 22c (a lower surface of the light guiding plate in FIG. 8)) orthogonal to the one edge 22a of the light guiding plate 22. The plurality of prism portions 4 are arranged in stripe shapes at predetermined pitches. Each prism portion 4 has the slight inclined plane 4a and the steep inclined plane 4b arranged closer to the one edge 1a than the slight inclined plane 4a.

The inclination angle $\gamma_1$ of the steep inclined plane 4b is set in the range of 20° to 90° with respect to a reference surface 22d of the one surface 22b, and the inclination angle $\gamma_2$ of the slight inclined plane 4a is set in the range of 0.5° to 5° with respect to the reference surface 22d. In addition, a pitch P between the prism portions 4 is set in the range of 0.05 to 0.5 mm. Further, the inclination angles $\gamma_1$ and $\gamma_2$ and pitch P of each prism portion 4 formed on the one surface 22b are equal to those of each prism portion 4 provided on the other surface 22c.

Furthermore, the light guiding plate 22 can be made of a transparent resin material, such as a polycarbonate-based resin or epoxy resin, or glass in addition to an acryl-based resin. In addition, the refractive index of the light guiding plate is preferably in the range of 1.40 to 1.60.

As shown in FIG. 9, light emitted from the light source device 3 to the light guiding plate 22 is introduced into the light guiding plate 22 through the one edge 22a. In FIG. 9, reference numeral '5' indicates a traveling path of light traveling inside the light guiding plate 22. The light 5 emitted from the light source device 3 travels toward the other edge 22e opposite to the one edge 22a inside the light guiding plate 22 while being reflected between the one surface 22b and the other surface 22c of the light guiding plate 22. When some of light components are incident on the slight inclined planes 4a at a predetermined threshold angle, the light components are emitted from the slight inclined planes 4a. Similarly, other light components are also emitted from the slight inclined planes 4a of the other surface 22c. The emitted light components travel in the direction of a predetermined angle with respect to the reference surface 22d of the light guiding plate 22. That is, light components incident on the light guiding plate 22 from the light emitting device 3 travel in different directions, but the light components are reflected in the same direction while traveling inside the light guiding plate 22. Thus, when the light components are emitted from the slight inclined planes 4a, the light components travel substantially in the same direction.

The traveling path of light inside the light guiding plate 22 depends on the inclination angle $\gamma_2$ of the slight inclined plane 4a, the inclination angle $\gamma_1$ of the steep inclined plane 4b, and the pitch P between the prism portions 4. Therefore, it is possible to adjust the emission direction of light from the slight inclined planes 4a by appropriately setting the inclination angles $\gamma_1$ and $\gamma_2$ and the pitch P.

The brightness of light emitted from the illuminating device of the present embodiment is measured in the same manner at that in the experiment 1 of the first embodiment. As a result, it is expected that light emitted from the one surface 22b have increasing brightness at an angle of about +60° and have the maximum brightness at an angle of about +80°. In addition, it is expected that no light be emitted in the normal direction of the reference surface 22d of the light guiding plate and in the negative direction thereof. That is, it is expected that emission light from the one surface 22b be emitted from the other edge 22e of the light guiding plate 22 in an angle range of 10° to 30° with respect to the reference surface 22d.

Further, the same prism portions as those on the one surface are formed on the other surface 22c. Therefore, similar to the case of the one surface, it is expected that light be emitted from the other edge 22e of the light guiding plate 22 in an angle range of 10° to 30° with respect to the reference surface 22d.

As such, according to the illuminating device 21 of the present embodiment, it is possible to emit light in a predetermined angle range with respect to the reference surface 22d. Therefore, it is possible to improve the directivity of emission light and to increase the brightness of the emission light.

Fourth Embodiment

Figure 10:
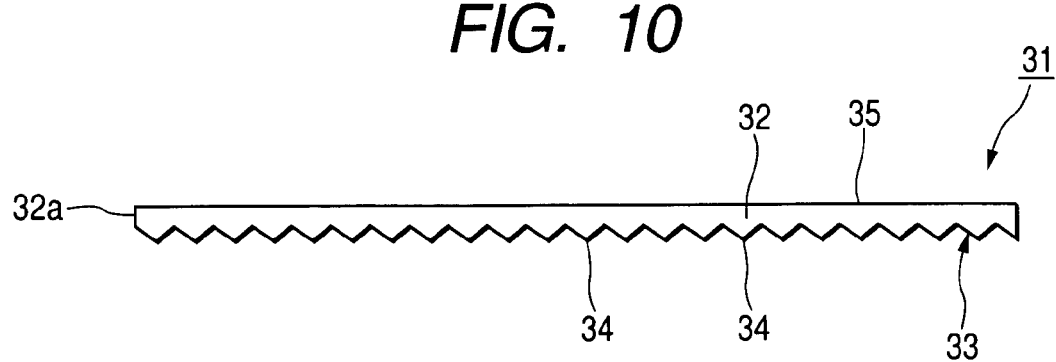
FIG. 10 is a cross-sectional view schematically illustrating a prism sheet according to a fourth embodiment of the present invention.

Next, a prism sheet according to a fourth embodiment of the present invention will be described with reference to the drawings. FIG. 10 is a side view schematically illustrating the prism sheet of the present embodiment, and FIG. 11 is an enlarged side view illustrating the main part of the prism sheet.

As shown in FIG. 10, in a prism sheet 31 of the present embodiment, a plurality of rib-shaped light refracting portions 34 are consecutively provided on an incident surface 33 of a transparent sheet 32, and an emission surface 35 opposite to the incident surface 33 is a flat surface.

Figure 11:
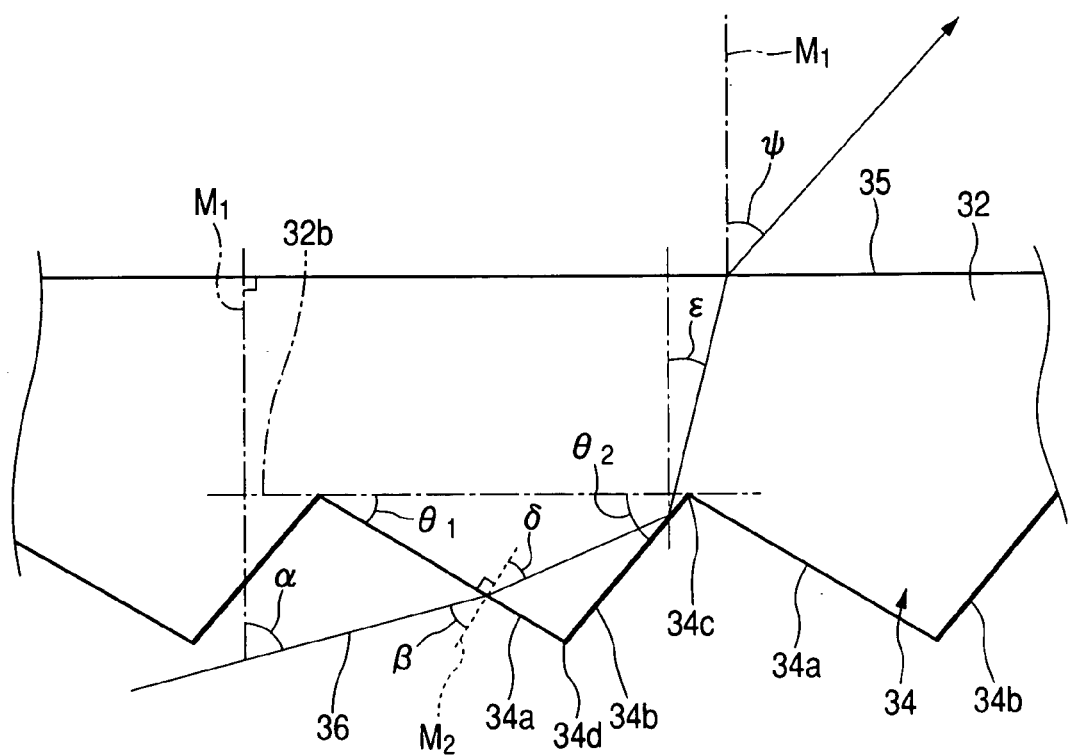
FIG. 11 is a cross-sectional view schematically illustrating the main parts of the prism sheet according to the fourth embodiment of the present invention.

As shown in FIG. 11, each light refracting portion 34 comprises a refractive surface 34a and a reflective surface 34b. Each refracting portion 34 extends in the direction parallel to one edge 32a of the transparent sheet 32. The respective light refracting portions 34 are connected to each other such that the refractive surface 34a of a light refracting portion 34 meets the reflective surface 34b of the next light refracting portion 34 to form a valley portion 34c. Further, each light refracting portion 34 has a top portion 34d where the refractive surface 34a meets the reflective surface 34b.

Furthermore, the transparent sheet 32 constituting the prism sheet 31 can be made of a transparent resin material, such as a polycarbonate-based resin or epoxy resin, or glass in addition to an acryl-based resin. In addition, the refractive index of the prism sheet is preferably in the range of 1.40 to 1.60.

Moreover, it is preferable to perform a satin finish on the emission surface 35. Therefore, it is possible to provide emission light of uniform brightness.

As shown in FIG. 11, in the prism sheet 31 of the present embodiment, a light component 36 obliquely incident on the transparent sheet 32 is refracted into the transparent sheet 32 by the refractive surface 34. Then, the incident light component 36 is reflected from the reflective surface 34b in the transparent sheet 32 and is then emitted from the emission surface 35.

In FIG. 11, the light component 36 is incident on the refractive surface 34a of the prism sheet 31 at an incident angle α with respect to the direction of a normal line $M_1$ of the emission surface 35 of the prism sheet. In addition, the light component 36 is incident on the refractive surface 34a at an angle β with respect to the direction of a normal line $M_2$ of the refractive surface 34a. When a refractive index of the transparent sheet is N, the light component 36 is incident on the refractive surface 34a and is then refracted at an angle δ with respect to the direction of the normal line $M_2$.

Next, the light component 36 is specularly reflected from the reflective surface 34b in the transparent sheet 32 to travel at an angle ε with respect to the direction of the normal line $M_1$ of the emission surface 35. Then, the light component 36 is refracted by the emission surface 35 and is emitted at an angle ψ with respect to the direction of the normal line $M_1$ of the emission surface 35. In addition, when ε=0°, ψ=0°.

The emission angle ψ is set to satisfy Expression 1 from the relationship between an inclination angle $θ_1$ of the refractive surface 34a, an inclination angle $θ_2$ of the reflective surface 34b, an incident angle α of light with respect to the prism sheet, and a refractive index N of the transparent sheet 32. In the present embodiment, the incident angle α corresponds to the emission angle with respect to the normal direction of the reference surface 2d of the illuminating device according to the first embodiment.

The prism sheet 31 of the present embodiment, which will be described later in detail, is combined with the illuminating device of the first or second embodiment, and the combination is used as an illuminating device (surface emitting device) of a liquid crystal display panel. That is, the incident surface 33 of the prism sheet is integrally mounted on one surface of the illuminating device 1 or 11. In order for the surface emitting device to efficiently illuminate the liquid crystal display panel, it is preferable to emit light in the normal direction of the emission surface of the prism sheet 31. That is, it is preferable to set the emission angle ε to zero degrees.

In order to set the emission angle ε to zero degree, it is preferable to set the inclination angle $θ_1$ of the refractive surface 34a, the inclination angle $θ_2$ of the reflective surface 34b, the incident angle α of light with respect to the prism sheet, and the refractive index N of the transparent sheet 32 such that Expression 2 is satisfied. In the present embodiment, the incident angle α corresponds to the emission angle with respect to the normal direction of the reference surface 2d of the illuminating device according to the first embodiment.

Figure 12:
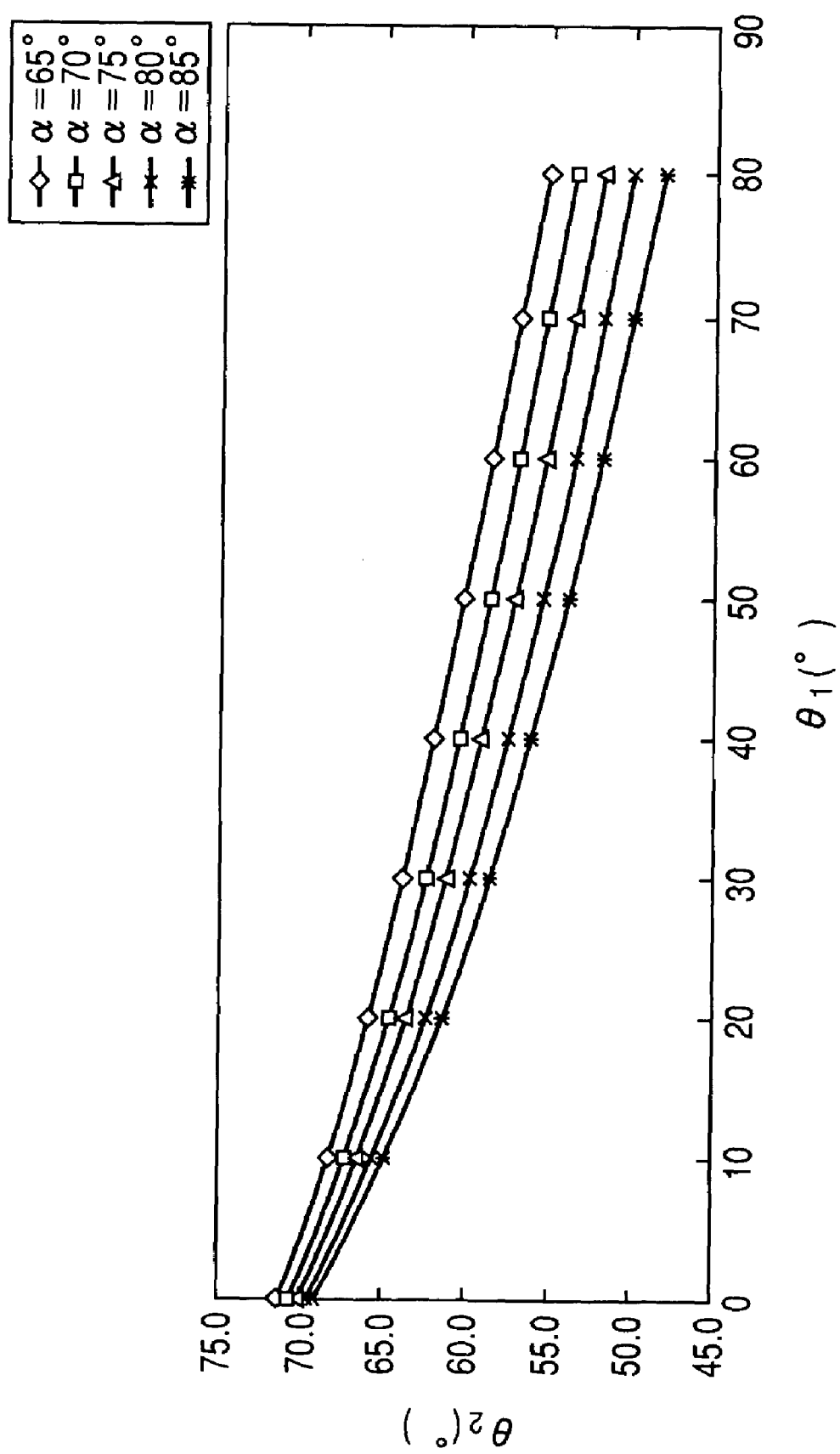
FIG. 12 is a graph illustrating the results obtained by simulating the relationship between inclination angles $\theta_1$ and $\theta_2$ of a refractive surface and a reflective surface of the prism sheet and an incident angle $\alpha$ of light.

FIG. 12 is a graph illustrating the relationship between the inclination angles $θ_1$ and $θ_2$ when the refractive index N of the transparent sheet is 1.49 and the incident angles α of light are 65°, 70°, 75°, 80°, and 85°, respectively. As shown in FIG. 12, it is understood that the inclination angle $θ_1$ is inversely proportional to the inclination angle $θ_2$. It is possible to make the emission angle ε of light from the prism sheet zero degrees by setting the inclination angles $θ_1$ and $θ_2$, the incident angle α, and the refractive index N to satisfy the relationship shown in FIG. 12.

Further, as described above, in order to emit light from the emission surface 35 of the prism sheet 31, the incident light component 36 should pass through the refractive surface 34a to reach the reflective surface 34b. Therefore, when a large amount of light reaches the reflective surface 34b, the brightness of light from the emission surface 35 increases. Thus, it is necessary that light components passing through the vicinity of the top portion 34d of the light refracting portion 34 reach the reflective surface 34b as much as possible. That is, it is necessary to optimize the inclination angles $θ_1$ and $θ_2$ of the refractive surface 34a and the reflective surface 34b by adjusting the incident angle α of the incident light.

Figure 13:
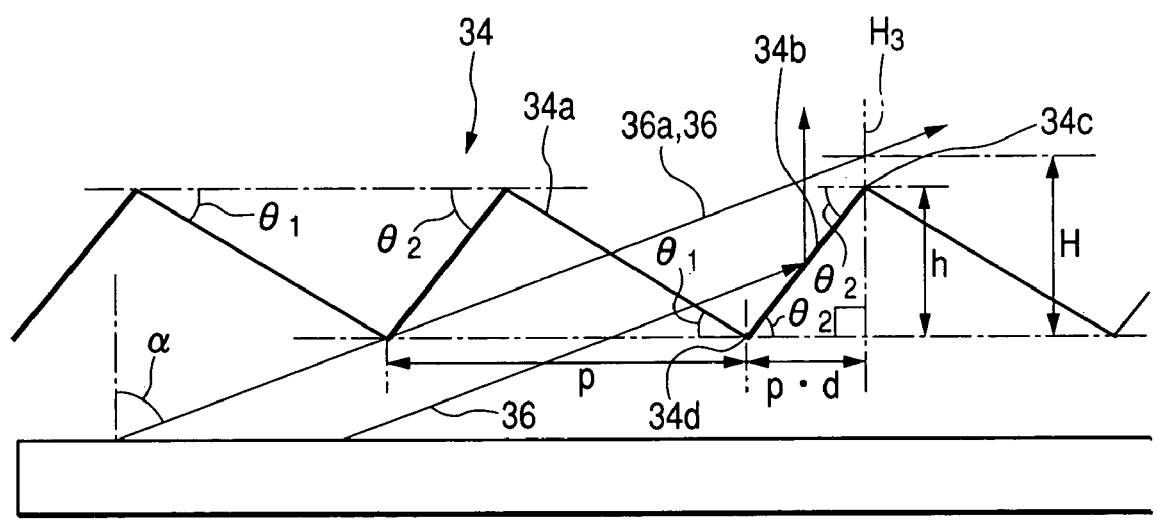
FIG. 13 is a side view schematically illustrating the main parts of the prism sheet according to the fourth embodiment of the present invention.

As shown in FIG. 13, when the pitch between the light refracting portions 34 is P, a projection length p d of the reflective surface 34b is obtained as follows:

$$p\,d = p\,\tan θ_1/(\tan θ_1 + \tan θ_2).$$

Further, when a height from the top portion to a point on a normal line of the valley portion 34c where a light component 36a passing through the refractive surface 34a so as not to reach the reflective surface 34b passes is H, the height H is obtained as follows:

$$H ≈ p(1+d)/\tan α.$$

Furthermore, a height h of the light refracting portion 34 is as follows:

In order for the incident light component 36 passing through the refractive surface 34a to reach the reflective surface 34b, it is preferable that h be larger than H. That is, it is preferable to determine the angles $θ_1$ and $θ_2$ such that the relationship $(1+d)/\tan α < d \tan θ_2$ is established.

When the angles $θ_1$ and $θ_2$ satisfy the above-mentioned relationship, it is possible to increase the quantity of emission light from the prism sheet 31.

When the emission angle ε is 0°, the incident angle α is in the range of 55° to 85°, and the angle $θ_1$ is in the range of 0° to 80°, the angle $θ_2$ is deduced from the relationship of FIG. 12 based on the angles α and $θ_1$. In this case, it is calculated whether the relationship H<h is established from the angles α, $θ_1$, and $θ_2$. The calculated results are shown in Tables 1 to 7.

TABLE 1

| Emission angle α | Angle of refractive surface $θ_1$ | Angle of reflective surface $θ_2$ | Projection length of $θ_2$ inclined plane (d) $\tan θ_1/(\tan θ_1 + \tan θ_2)$ | Height of a point where light passes (H/p) $(1 + d)/\tan α$ | Height of prism (h/p) $d \tan θ_2$ | Effective angle range H < h |
|---|---|---|---|---|---|---|
| 55 | 0  | 73.3 | 0.00 | 0.70 | 0.00 | X |
| 55 | 10 | 70.8 | 0.06 | 0.74 | 0.17 | X |
| 55 | 20 | 68.7 | 0.12 | 0.79 | 0.32 | X |
| 55 | 30 | 66.8 | 0.20 | 0.84 | 0.46 | X |
| 55 | 40 | 65.0 | 0.28 | 0.90 | 0.60 | X |

TABLE 1-continued

| Emission angle α | Angle of refractive surface θ₁ | Angle of reflective surface θ₂ | Projection length of θ₂ inclined plane (d) tanθ₁/(tanθ₁ + tanθ₂) | Height of a point where light passes (H/p) (1 + d)/tanα | Height of prism (h/p) dtanθ₂ | Effective angle range H < h |
|---|---|---|---|---|---|---|
| 55 | 50 | 63.3 | 0.37 | 0.96 | 0.75 | X |
| 55 | 60 | 61.7 | 0.48 | 1.04 | 0.90 | X |
| 55 | 70 | 60.0 | 0.61 | 1.13 | 1.06 | X |
| 55 | 80 | 58.2 | 0.78 | 1.25 | 1.26 | ○ |

(α = 55°, and ε = 0°)

TABLE 2

| Emission angle α | Angle of refractive surface θ₁ | Angle of reflective surface θ₂ | Projection length of θ₂ inclined plane (d) tanθ₁/(tanθ₁ + tanθ₂) | Height of a point where light passes (H/p) (1 + d)/tanα | Height of prism (h/p) dtanθ₂ | Effective angle range H < h |
|---|---|---|---|---|---|---|
| 60 | 0 | 72.2 | 0.00 | 0.58 | 0.00 | X |
| 60 | 10 | 69.5 | 0.06 | 0.61 | 0.17 | X |
| 60 | 20 | 67.2 | 0.13 | 0.65 | 0.32 | X |
| 60 | 30 | 65.2 | 0.21 | 0.70 | 0.46 | X |
| 60 | 40 | 63.4 | 0.30 | 0.75 | 0.59 | X |
| 60 | 50 | 61.7 | 0.39 | 0.80 | 0.73 | X |
| 60 | 60 | 60.0 | 0.50 | 0.87 | 0.87 | X |
| 60 | 70 | 58.3 | 0.63 | 0.94 | 1.02 | ○ |
| 60 | 80 | 56.6 | 0.79 | 1.03 | 1.20 | ○ |

(α = 60°, and ε = 0°)

TABLE 3

| Emission angle α | Angle of refractive surface θ₁ | Angle of reflective surface θ₂ | Projection length of θ₂ inclined plane (d) tanθ₁/(tanθ₁ + tanθ₂) | Height of a point where light passes (H/p) (1 + d)/tanα | Height of prism (h/p) dtanθ₂ | Effective angle range H < h |
|---|---|---|---|---|---|---|
| 65 | 0 | 71.3 | 0.00 | 0.47 | 0.00 | X |
| 65 | 10 | 68.3 | 0.07 | 0.50 | 0.16 | X |
| 65 | 20 | 65.8 | 0.14 | 0.53 | 0.31 | X |
| 65 | 30 | 63.7 | 0.22 | 0.57 | 0.45 | X |
| 65 | 40 | 61.8 | 0.31 | 0.61 | 0.58 | X |
| 65 | 50 | 60.0 | 0.41 | 0.66 | 0.71 | ○ |
| 65 | 60 | 58.3 | 0.52 | 0.71 | 0.84 | ○ |
| 65 | 70 | 56.7 | 0.64 | 0.77 | 0.98 | ○ |
| 65 | 80 | 55.0 | 0.80 | 0.84 | 1.14 | ○ |

(α = 65°, and ε = 0°)

TABLE 4

| Emission angle α | Angle of refractive surface θ₁ | Angle of reflective surface θ₂ | Projection length of θ₂ inclined plane (d) tanθ₁/(tanθ₁ + tanθ₂) | Height of a point where light passes (H/p) (1 + d)/tanα | Height of prism (h/p) dtanθ₂ | Effective angle range H < h |
|---|---|---|---|---|---|---|
| 70 | 0 | 70.5 | 0.00 | 0.36 | 0.00 | X |
| 70 | 10 | 67.2 | 0.07 | 0.39 | 0.16 | X |
| 70 | 20 | 64.5 | 0.15 | 0.42 | 0.31 | X |
| 70 | 30 | 62.2 | 0.23 | 0.45 | 0.44 | X |
| 70 | 40 | 60.2 | 0.32 | 0.48 | 0.57 | ○ |
| 70 | 50 | 58.4 | 0.42 | 0.52 | 0.69 | ○ |

TABLE 4-continued

| Emission angle α | Angle of refractive surface $\theta_1$ | Angle of reflective surface $\theta_2$ | Projection length of $\theta_2$ inclined plane (d) $\tan\theta_1/(\tan\theta_1 + \tan\theta_2)$ | Height of a point where light passes (H/p) $(1 + d)/\tan\alpha$ | Height of prism (h/p) $d\tan\theta_2$ | Effective angle range H < h |
|---|---|---|---|---|---|---|
| 70 | 60 | 56.7 | 0.53 | 0.56 | 0.81 | ○ |
| 70 | 70 | 55.0 | 0.66 | 0.60 | 0.94 | ○ |
| 70 | 80 | 53.3 | 0.81 | 0.66 | 1.09 | ○ |

(α = 70°, and ε = 0°)

TABLE 5

| Emission angle α | Angle of refractive surface $\theta_1$ | Angle of reflective surface $\theta_2$ | Projection length of $\theta_2$ inclined plane (d) $\tan\theta_1/(\tan\theta_1 + \tan\theta_2)$ | Height of a point where light passes (H/p) $(1 + d)/\tan\alpha$ | Height of prism (h/p) $d\tan\theta_2$ | Effective angle range H < h |
|---|---|---|---|---|---|---|
| 75 | 0 | 69.8 | 0.00 | 0.27 | 0.00 | X |
| 75 | 10 | 66.3 | 0.07 | 0.29 | 0.16 | X |
| 75 | 20 | 63.3 | 0.15 | 0.31 | 0.31 | X |
| 75 | 30 | 60.8 | 0.24 | 0.33 | 0.44 | ○ |
| 75 | 40 | 58.7 | 0.34 | 0.36 | 0.56 | ○ |
| 75 | 50 | 56.8 | 0.44 | 0.39 | 0.67 | ○ |
| 75 | 60 | 55.0 | 0.55 | 0.41 | 0.78 | ○ |
| 75 | 70 | 53.3 | 0.67 | 0.45 | 0.90 | ○ |
| 75 | 80 | 51.7 | 0.82 | 0.49 | 1.03 | ○ |

(α = 75°, and ε = 0°)

TABLE 6

| Emission angle α | Angle of refractive surface $\theta_1$ | Angle of reflective surface $\theta_2$ | Projection length of $\theta_2$ inclined plane (d) $\tan\theta_1/(\tan\theta_1 + \tan\theta_2)$ | Height of a point where light passes (H/p) $(1 + d)/\tan\alpha$ | Height of prism (h/p) $d\tan\theta_2$ | Effective angle range H < h |
|---|---|---|---|---|---|---|
| 80 | 0 | 69.3 | 0.00 | 0.18 | 0.00 | X |
| 80 | 10 | 65.5 | 0.07 | 0.19 | 0.16 | X |
| 80 | 20 | 62.2 | 0.16 | 0.20 | 0.31 | ○ |
| 80 | 30 | 59.5 | 0.25 | 0.22 | 0.43 | ○ |
| 80 | 40 | 57.2 | 0.35 | 0.24 | 0.54 | ○ |
| 80 | 50 | 55.2 | 0.45 | 0.26 | 0.65 | ○ |
| 80 | 60 | 53.4 | 0.56 | 0.28 | 0.76 | ○ |
| 80 | 70 | 51.7 | 0.68 | 0.30 | 0.87 | ○ |
| 80 | 80 | 50.0 | 0.83 | 0.32 | 0.98 | ○ |

(α = 80°, and ε = 0°)

TABLE 7

| Emission angle α | Angle of refractive surface $\theta_1$ | Angle of reflective surface $\theta_2$ | Projection length of $\theta_2$ inclined plane (d) $\tan\theta_1/(\tan\theta_1 + \tan\theta_2)$ | Height of a point where light passes (H/p) $(1 + d)/\tan\alpha$ | Height of prism (h/p) $d\tan\theta_2$ | Effective angle range H < h |
|---|---|---|---|---|---|---|
| 85 | 0 | 69.0 | 0.00 | 0.09 | 0.00 | X |
| 85 | 10 | 64.8 | 0.08 | 0.09 | 0.16 | ○ |
| 85 | 20 | 61.3 | 0.17 | 0.10 | 0.30 | ○ |
| 85 | 30 | 58.3 | 0.26 | 0.11 | 0.43 | ○ |
| 85 | 40 | 55.8 | 0.36 | 0.12 | 0.53 | ○ |
| 85 | 50 | 53.7 | 0.47 | 0.13 | 0.64 | ○ |
| 85 | 60 | 51.8 | 0.58 | 0.14 | 0.73 | ○ |

TABLE 7-continued

| Emission angle α | Angle of refractive surface $\theta_1$ | Angle of reflective surface $\theta_2$ | Projection length of $\theta_2$ inclined plane (d) $\tan\theta_1/(\tan\theta_1 + \tan\theta_2)$ | Height of a point where light passes (H/p) $(1 + d)/\tan\alpha$ | Height of prism (h/p) $d\tan\theta_2$ | Effective angle range H < h |
|---|---|---|---|---|---|---|
| 85 | 70 | 50.0 | 0.70 | 0.15 | 0.83 | ○ |
| 85 | 80 | 48.3 | 0.83 | 0.16 | 0.94 | ○ |

(α = 85°, and ε = 0°)

For example, as shown in Table 1, in case that the incident angle α of light with respect to the prism sheet 31 is 55°, when the angle $\theta_1$ is set to 80°, and the angle $\theta_2$ is set to 58.2°, the relationship H<h is established. In this case, it is possible to obtain the maximum quantity of emission light.

(Experiment 2)

The present experiment is performed to verity the reliability of simulation data shown in Tables 1 to 7 and FIG. 12.

Figure 14:
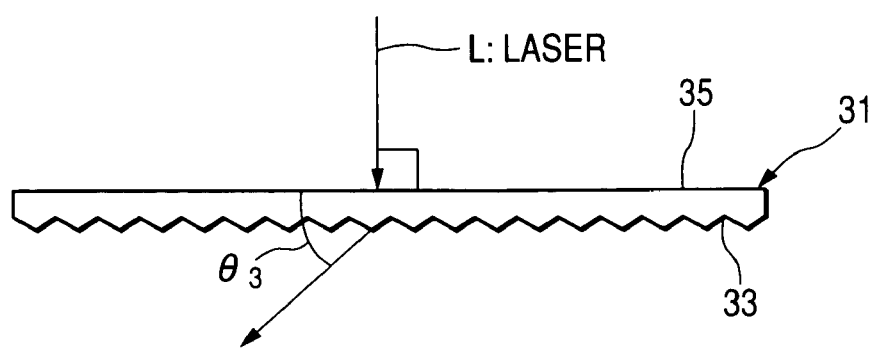
FIG. 14 is a schematic view illustrating the positional relationship between the prism sheet and laser beams in an experiment 2.

The prism sheet 31 is composed of a transparent acryl resin (product name: Delpet 80NH) having a thickness of 0.6 mm, and the inclination angle $\theta_1$ of the refractive surface is set in the range of 50° to 55°. In addition, the inclination angle $\theta_2$ of the reflective surface is set in the range of 55.2° to 55.9°, and the pitch P is set to 0.070 mm. Then, as shown in FIG. 14, a laser beam L is irradiated to the emission surface 35 in the normal direction of the emission surface 35 of the prism sheet 31, and a refracting angle $\theta_3$ of the laser beam L emitted from the incident surface 33 is examined. The results are shown in Table 8.

TABLE 8

| $\theta_1$ | $\theta_2$ | Design value of α | Refracting angle $\theta_3$ |
|---|---|---|---|
| 50.0° | 55.2° | 80° | 81.6° |
| 50.0° | 58.4° | 70° | 70.8° |
| 55.0° | 55.9° | 75° | 75.5° |

As shown in Table 8, the lager beam L incident on the prism sheet 31 having an inclination angle $\theta_1$ of 50° and an inclination angle $\theta_2$ of 55.2° is reflected from the reflective surface in the prism sheet 31 and is then emitted from the refractive surface. In this case, the refracting angle $\theta_3$ of the laser beam with respect to the normal direction of the emission surface 33 is 81.6°.

In consideration of the conjugate properties of light, when the laser beam is incident on the prism sheet at an angle of 81.6°, the above-mentioned result means that the laser beam is emitted in the normal direction of the emission surface.

Further, the above-mentioned prism sheet corresponds to the sixth prism sheet in Table 6, that is, corresponds to a case in which simulation is performed when α is 80°. Thus, in the present experiment, although a theoretical value is 80°, an experimental value is 81.6°. As such, according to the present experiment, it is understood that the simulation data shown in Tables 1 to 7 and FIG. 12 has high reliability.

Furthermore, similarly, according to the results of the experiment shown in Table 8, the design value of α is very approximate to the measured value.

As described above, according to the prism sheet 31 of the present embodiment, it is possible to emit incident light in a predetermined direction by the refractive surfaces 34a and the reflective surfaces 34b. In particular, the prism sheet 31 can refract incident light having high directivity with little dispersion. In addition, light incident at an angle α with respect to the normal direction of the emission surface 35 can be emitted in the normal direction of the emission surface 35 by setting the angles α, $\theta_1$, and $\theta_2$ to satisfy the relationship of Expression 2 and FIG. 12. Further, it is possible to increase the quantity of light incident on the refractive surface 34a and is then reflected from the reflective surface 34b by establishing the relationship H<h, thereby improving the brightness of emission light.

Fifth Embodiment

Figure 15:
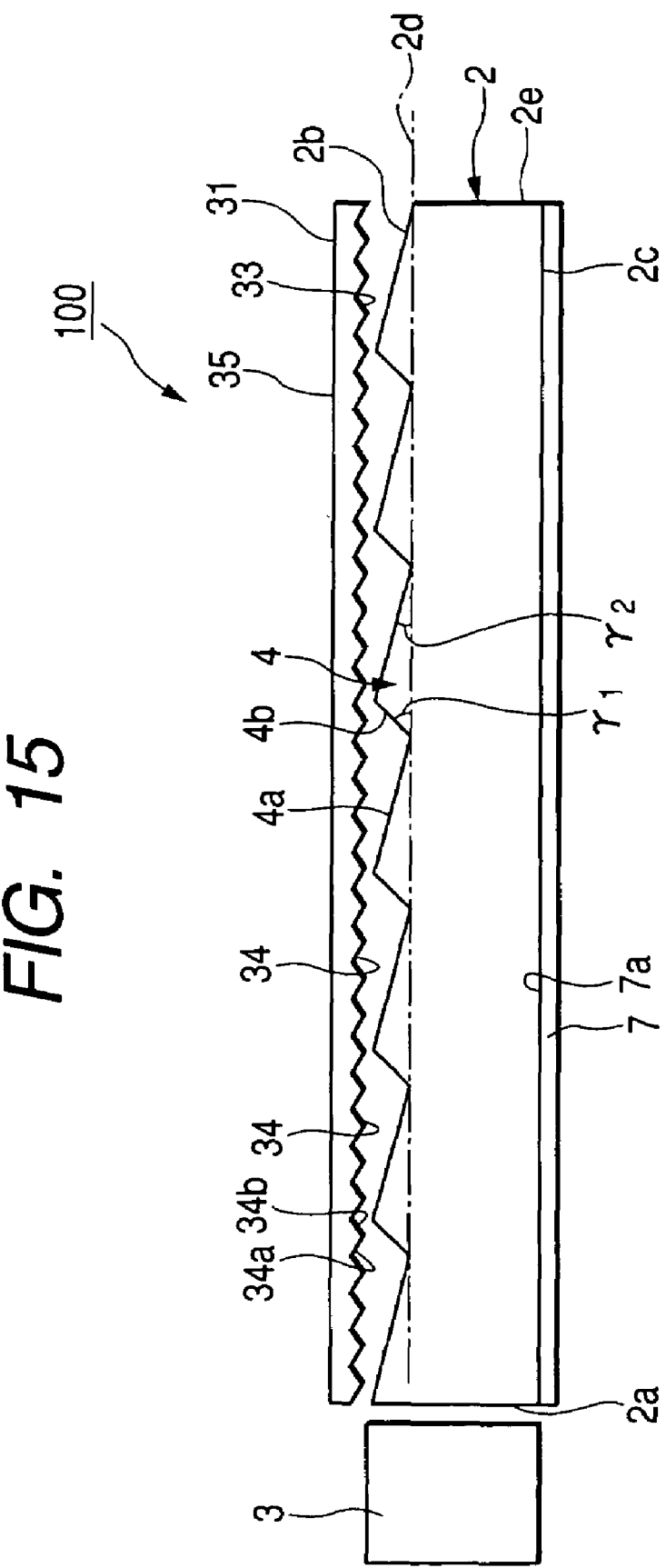
FIG. 15 is a side view schematically illustrating a surface emitting device according to a fifth embodiment of the present invention.
Figure 16:
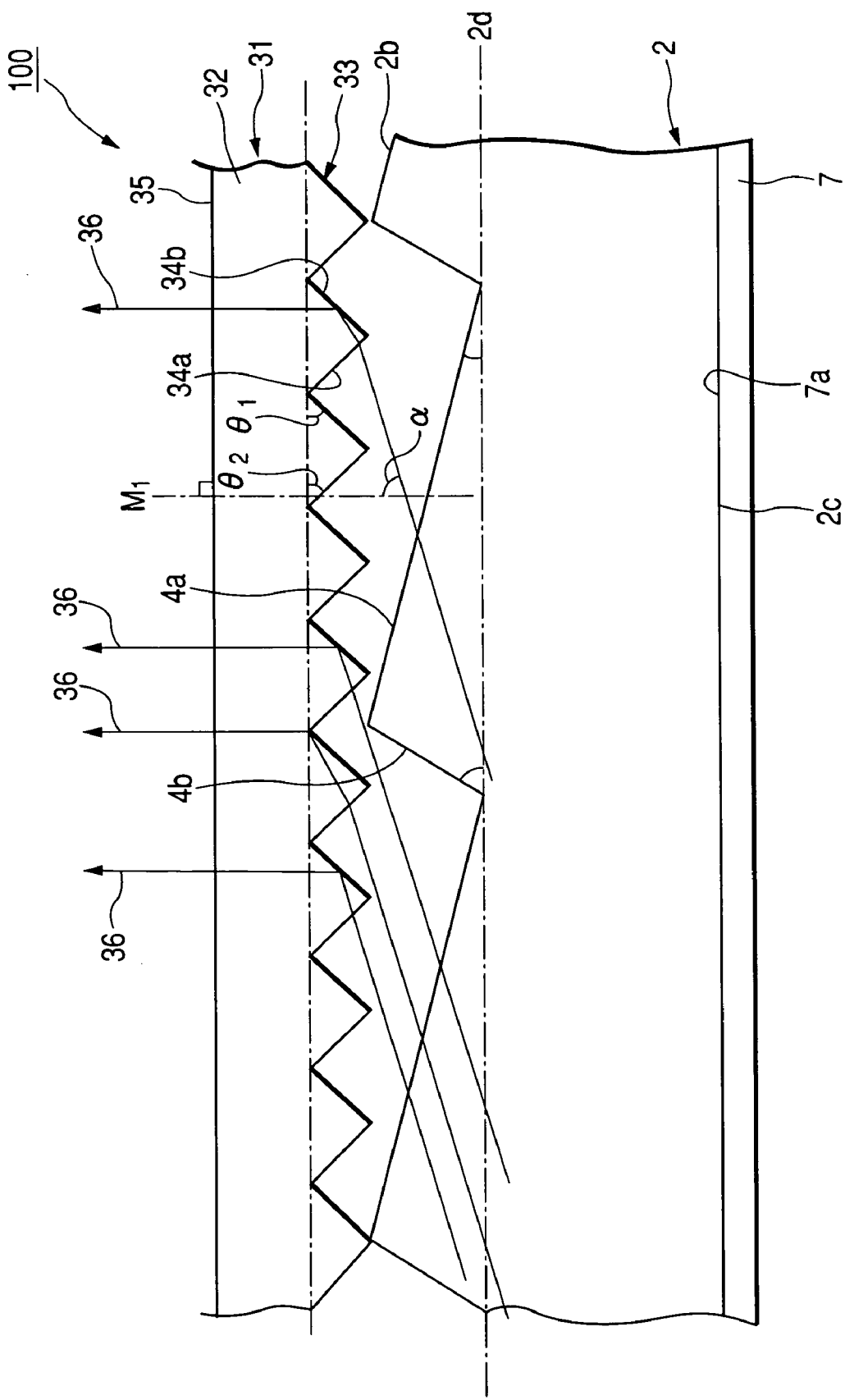
FIG. 16 is a schematic view illustrating the traveling direction of light introduced into the surface emitting device according to the fifth embodiment of the present invention.

Next, a surface emitting device according to a fifth embodiment of the present invention will be described with reference to the drawings. FIG. 15 is a schematic side view of a surface emitting device 100 according to the present embodiment, and FIG. 16 is a schematic view illustrating the traveling direction of light introduced into the surface emitting device 100. Further, the surface emitting device 100 of the present embodiment is constructed by combining the illuminating device of the second embodiment with the prism sheet of the fourth embodiment. Therefore, in the surface emitting device 100 of the present embodiment shown in FIGS. 15 and 16, the same components as those in the illuminating device of the second embodiment and the prism sheet of the fourth embodiment have the same reference numerals, and a description thereof will be omitted for simplicity of explanation.

As shown in FIG. 15, the surface emitting device 100 of the present embodiment includes the light guiding plate 2, the light source device 3 arranged in the vicinity of the one edge 2a of the light guiding plate 2, the prism sheet 31 arranged on one surface 2b orthogonal to the one edge 2a of the light guiding plate 2, and the reflective plate 7 bonded to the other surface 2c of the light guiding plate 2.

The light guiding plate 2 is composed of a transparent plate, such as an acrylic resin plate, so that light emitted from the light source device 3 provided at the side of the one edge 2a is introduced into the light guiding plate 2 through the one edge 2a. A plurality of rib-shaped prism portions 4 each having the slight inclined plane 4a and the steep inclined plane 4b are consecutively provided on the one surface 2b of the light guiding plate 2. In addition, the other surface 2c opposite to the one surface 2b is a flat surface.

The inclination angle $\gamma_1$ of the steep inclined plane 4b is set in the range of 20° to 90° with respect to the reference surface 2d of the one surface 2b, and the inclination angle $\gamma_2$ of the slight inclined plane 4a is set in the range of 0.5° to 5° with respect to the reference surface 2d. In addition, the pitch P between the prism portions 4 is set in the range of 0.05 to 0.50 mm. Further, the larger the pitch P is, the larger the brightness of light emitted from the prism sheet 31 when the prism sheet 31 is superposed becomes, as will be described later. Further, the smaller the inclination angle $\gamma_2$ of the slight inclined plane 4a becomes, the more uniform the brightness when the prism sheet is superposed becomes. In addition, the smaller the inclination angle $\gamma_2$ of the slight inclined plane 4a becomes, the more uniform the brightness of emission light when the prism sheet 31 is superposed becomes. Furthermore, the refractive index of the light guiding plate is preferably in the range of 1.40 to 1.60.

The reflective plate 7 having a metallic glossy surface as the reflective surface 7a is bonded to the other surface 2c of the light guiding plate 2.

In the prism sheet 31, a plurality of rib-shaped light refracting portions are consecutively provided on the incident surface 33 of the transparent sheet 32, and the emission surface 35 opposite to the incident surface 33 is a flat surface. Each light refracting portion 34 comprises the refractive surface 34a and the reflective surface 34b. Each light refracting portion 34 extends in the direction parallel to the one edge 32a of the transparent sheet 32.

The prism sheet 31 is superposed on the one surface 2b of the light guiding plate 2 with the incident surface 33 facing the light guiding plate 2. In addition, the prism sheet 31 is arranged on the light guiding plate 2 with the refractive surface 34a facing the light source device 3.

As shown in FIG. 16, light components 36 introduced into the light guiding plate 2 travel inside the light guiding plate 2 while being reflected between the one surface 2b and the other surface 2c of the light guiding plate 2. When some of the light components 36 are incident on the slight inclined plane 4a at a predetermined threshold angle, the light components are emitted from the slight inclined plane 4a. In this case, as shown in FIG. 16, the emission light is emitted at an angle $\alpha$ with respect to a normal line $M_1$ of the emission surface 35 of the prism sheet 31.

Further, since the reflective plate 7 is bonded to the other surface 2c of the light guiding plate 2, light traveling inside the light guiding plate 2 to be incident on the other surface 2c is always specularly reflected from the reflective surface 7a. Therefore, most of light components traveling inside the light guiding plate 2 are emitted from the one surface 2b, and no light component is emitted from the other surface 2c.

Then, the light components 36 emitted from the light guiding plate 2 travel toward the prism sheet 31. The light components 36 are incident on the refractive surface 34a at the angle $\alpha$ with respect to a normal line $M_1$. Subsequently, the light components 36 are specularly reflected from the reflective surfaces 34b in the transparent sheet 32 and are then emitted from the emission surface 35. The light components 36 are emitted substantially in the normal direction of the emission surface 35.

In order to emit the light components 36 in the normal direction of the emission surface 35 of the prism sheet 31, it is necessary that the inclination angles $\theta_1$ and $\theta_2$ of the refractive surface 34a and the reflective surface 34b, the incident angle $\alpha$, and the refractive index N of the prism sheet satisfy Expression 3.

In addition, in order to increase the quantity of light reaching the refractive surfaces 34a and the reflective surfaces 34b, it is necessary to satisfy the relationship H<h as described in the fourth embodiment.

(Experiment 3)

The light guiding plate 2 is composed of a transparent acryl resin (product name: Delpet 80NH) having a length of 50 mm, a width of 66 mm, and a thickness of 1.0 mm. In addition, the inclination angle of the slight inclined plane 4a is set in the range of 1.5° to 4.0°, and the inclination angle of the steep inclined plane 4b is set in the range of 40° to 45°.

Further, the pitch P is set in the range of 0.14 to 0.257 mm. Furthermore, a reflective plate coated with silver is mounted on the light guiding plate. The light source device 3 is constructed by mounting two LEDs (light emitting devices) having a rated current of 10 mA to both ends of a bar light guiding body. In addition, a prism sheet composed of a transparent acryl resin having a thickness of 0.6 mm is used in which the inclination angle $\theta_1$ of a refractive surface is 50°, the inclination angle $\theta_2$ of a reflective surface is 56.8°, and the pitch P is 0.070 mm. Then, as shown in FIG. 16, the surface emitting device 100 is manufactured by combining the light guiding plate, the light source device, and the prism sheet.

Then, a brightness measuring sensor is arranged on a normal line of the emission surface of the surface emitting device 100 (prism sheet) manufactured in this way, and the LEDs of the light source device are turned on to measure the brightness of light emitted from the emission surface. The measured results are shown in Table 9.

TABLE 9

| No. | $\gamma_1$ | $\gamma_2$ | Pitch (mm) | Inclination angle (degree) | Brightness (cd/m$^2$) |
|---|---|---|---|---|---|
| 1 | 2.0 | 43 | 0.257 | 0 | 1188 |
| 2 | 2.3 | 43 | 0.257 | 0 | 1182 |
| 3 | 2.0 | 43 | 0.257 | 0 | 1028 |
| 4 | 2.3 | 43 | 0.257 | 0 | 1005 |
| 5 | 2.3 | 43 | 0.180 | 7.5 | 993 |
| 6 | 1.9 | 45 | 0.257 | 0 | 985 |
| 7 | 2.2 | 41.5 | 0.160 | 0 | 948 |
| 8 | 2.3 | 41 | 0.193 | 0 | 937 |
| 9 | 2.3 | 43 | 0.140 | 0 | 931 |
| 10 | 2.6 | 41 | 0.193 | 0 | 927 |
| 11 | 2.0 | 45 | 0.257 | 0 | 922 |
| 12 | 2.0 | 43 | 0.257 | 0 | 912 |
| 13 | 2.3 | 43 | 0.140 | 0 | 910 |
| 14 | 2.6 | 40 | 0.193 | 0 | 908 |
| 15 | 2.6 | 40 | 0.193 | 0 | 891 |
| 16 | 2.3 | 43 | 0.180 | 7.5 | 880 |
| 17 | 2.3 | 43 | 0.160 | 0 | 818 |
| 18 | 1.50 | 44 | 0.140 | 0 | 818 |
| 19 | 2.3 | 43 | 0.10–0.24 | 0 | 740 |
| 20 | 4.0 | 41 | 0.140 | 0 | 485 |

As can be seen from Table 9, the larger the pitch P between the prism portions 4 of the light guiding plate 2 is, the higher brightness becomes.

As described above, according to the surface emitting device 100 of the present embodiment, light components emitted from the light source device 3 pass through the slight inclined planes 4a of the light guiding plate 2 to travel in the same direction, so that the emitted light components can be refracted in a predetermined direction by the prism sheet 31. Therefore, it is possible to emit light having high brightness, uniform brightness uniformity, and high directivity from the emission surface 35 of the prism sheet 31.

Sixth Embodiment

Figure 17:
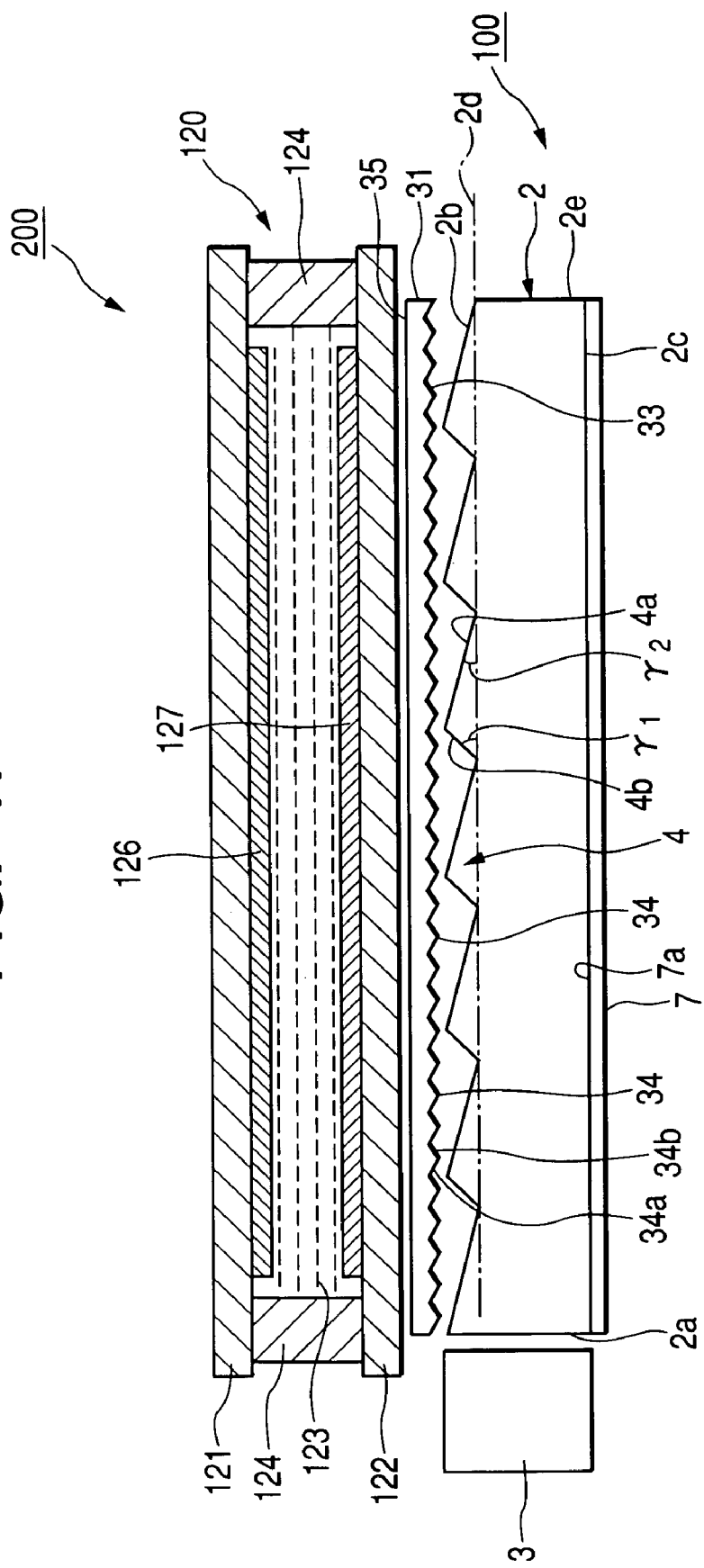
FIG. 17 is a side view schematically illustrating a liquid crystal display device according to a sixth embodiment of the present invention.

Next, a liquid crystal display device according to a sixth embodiment of the present invention will be described with reference to the drawings. FIG. 17 is a schematic side view of the liquid crystal display device according to the present embodiment. The liquid crystal display device of the present embodiment is constructed by mounting the surface emitting device of the fifth embodiment to a liquid crystal panel. Therefore, in the liquid crystal display device of the present embodiment shown in FIG. 17, the same components as those in the surface emitting device of the fifth embodiment have the same reference numerals, and a description thereof will be omitted for the simplicity of explanation.

A liquid crystal display device 200 of the present embodiment comprises a liquid crystal display panel 120 and the surface emitting device 100 provided at the rear side of the liquid crystal display panel 120 to illuminate the back surface of the liquid crystal display panel 120.

The liquid crystal display panel 120 is a transflective type and comprises first and second substrates 121 and 122 made of a transparent material, such as glass, and opposite to each other, a liquid crystal layer 123 interposed therebetween, and a sealing material 124 for boding the first substrate 121 to the second substrate 122. Display circuit portions 126 and 127 are provided on the surfaces of the first and second substrates 121 and 122 facing the liquid crystal layer 123, respectively.

The display circuit portion 127 provided on the surface of the second substrate 122 facing the liquid crystal layer 123 is constructed by forming, on the second substrate 122, a transflective film (not shown), color filters (not shown) for color display, an overcoat layer (not shown) for protecting the transflective film and the color filters and for planarizing unevenness caused by them, stripe-shaped electrodes (not shown) for driving the liquid crystal layer 123, and an alignment film (not shown) for controlling the arrangement of liquid crystal molecules constituting the liquid crystal layer 123 in this order.

Further, the display circuit portion 126 provided on the surface of the first substrate 121 facing the liquid crystal layer 123 is constructed by forming stripe-shaped electrodes (not shown), an overcoat layer (not shown), and an alignment film (not shown) on the first substrate 121 in this order.

In the liquid crystal display device 200 of the present embodiment, light emitted from the light source device 3 travels inside the liquid guiding plate 2 and is then emitted from the slight inclined planes 4a. Then, the emitted light is refracted by the prism sheet 31 and is then emitted to the liquid crystal display panel 120. In this case, the light is emitted substantially in the normal direction of the emission surface 35. Subsequently, the emitted light passes through the first substrate 122, the display circuit portion 127, the liquid crystal layer 123, the display circuit portion 126, and the second substrate 121 in this order and is then emitted from the liquid crystal display panel 120.

As such, since light having high directivity is emitted from the surface emitting device 100 to the liquid crystal display panel 120, it is possible to increase the brightness of the liquid crystal display panel 120 and to greatly reduce display irregularity.

Further, the technical field of the present invention is not limited to the above-mentioned embodiments, and various modifications and changes can be made without departing from the spirit and scope of the present invention. For example, according to the present invention, the reflective plate is arranged at the side of the flat surface of the light guiding plate. However, the reflective surface may be arranged at the side of the prism surface of the light guiding plate. In addition, the reflective plate may be arranged at the side of the prism surface of the light guiding plate, and the prism sheet may be arranged at the side of the flat surface.

What is claimed is:

1. A surface emitting device comprising:
    a light guiding plate;
    a light source arranged in the vicinity of one edge of the light guiding plate; and
    a prism sheet composed of a transparent sheet and arranged on one surface of the light guiding plate orthogonal to the one edge,
    wherein at least one of the one surface and an opposing surface of the light guiding plate has a plurality of rib-shaped prism portions each having a slight inclined plane and a steep inclined plane arranged closer to the one edge than the slight inclined plane, both the slight inclined plane and the steep inclined plane consecutively provided on at least one of the one surface and the opposing surface of the light guiding plate opposing the one surface,
    wherein a plurality of rib-shaped light refracting portions each having a refractive surface and a reflecting surface are consecutively provided on an incident surface of the prism sheet facing the light guiding plate, an emission surface opposite to the incident surface is a flat surface, and the prism sheet is arranged on the light guiding plate with the refractive surfaces facing the light source,
    wherein light introduced into the light guiding plate from the light source through the one edge is emitted from the slight inclined plane and is then incident on the light refracting portion, and the light incident on the light refracting portion is introduced into the transparent sheet by the refractive surface and is then refracted from the reflective surface in the transparent sheet to be emitted from the emission surface, and
    wherein, when an incident angle of the incident light with respect to the normal direction of the emission surface of the prism sheet is α, an emission angle with respect to the emission surface is ψ, an inclination angle of the refractive surface with respect to the emission surface is $\theta_1$, an inclination angle of the reflective surface with respect to the emission surface is $\theta_2$, and a refractive index of the transparent sheet is N, the inclination angles $\theta_1$ and $\theta_2$ satisfy the following Expression 3:

$\theta_2 = \frac{1}{2}[180 - \theta_1 - \sin^{-1}\{\sin(\alpha - \theta_1)/N\} - \sin^{-1}(\sin \psi / N)]$.  [Expression 3]

2. The surface emitting device according to claim 1, wherein, when an inclination angle of the refractive surface with respect to the emission surface of the prism sheet is $\theta_1$, an inclination angle of the reflective surface with respect to the emission surface thereof is $\theta_2$, an emission angle of light emitted from the light guiding plate with respect to the normal direction of the emission surface is α, and a refractive index of the transparent sheet is N, the inclination angles $\theta_1$ and $\theta_2$ satisfy the following Expression 4:

$\theta_2 = \frac{1}{2}[180 - \theta_1 - \sin^{-1}\{\sin(\alpha - \theta_1)/N\}]$.  [Expression 4]

3. The surface emitting device according to claim 1, wherein each light refracting portion has a top portion where the refractive surface meets the reflective surface, and a valley portion is formed between adjacent light refracting portions, and
    wherein, when a height from the top portion to the valley portion is a height h of the light refracting portion and a height from the top portion to a point on a normal line with respect to the valley portion of the transparent sheet where the incident light passes is H, H<h is satisfied.

4. The surface emitting device according to claim 1, wherein a reflective plate having a metallic glossy surface is provided on the opposing surface of the light guiding plate.

5. The surface emitting device according to claim 1, wherein a reflective plate having a metallic glossy surface is provided on the one surface of the light guiding plate.

6. The surface emitting device according to claim 1,
wherein an inclination angle $\gamma_1$ of the steep inclined plane with respect to at least one of the one surface and the opposing surface is set in the range of 20° to 90°, and an inclination angle $\gamma_2$ of the slight inclined plane with respect to at least one of one surface and the other surface is set in the range of 0.5° to 5°.

7. The surface emitting device according to claim 1,
wherein a roughen finish is performed on the emission surface.

8. A liquid crystal display device comprising:
a liquid crystal panel in which a liquid crystal layer is interposed between a pair of substrates; and
the surface emitting device according to claim 1,
wherein the liquid crystal display panel is arranged such that a rear surface thereof faces a prism sheet of the surface emitting device.

9. A prism sheet in which a plurality of rib-shaped light refracting portions each having a refractive surface and a reflective surface are consecutively provided on an incident surface of a transparent sheet, and an emission surface opposite to the incident surface is a flat surface,
wherein light obliquely incident on the transparent sheet is introduced into the transparent sheet by the refractive surface of each light refracting portion,
wherein the incident light is reflected from the reflective surface inside the transparent sheet and is then emitted from the emission surface of the transparent sheet,
wherein, when an inclination angle of the refractive surface with respect to the emission surface is $\theta_1$, an inclination angle of the reflective surface with respect to the emission surface is $\theta_2$, an incident angle of the incident light with respect to the normal direction of the emission surface is $\alpha$, a refractive index of the transparent sheet is N, and the inclination angles $\theta_1$ and $\theta_2$ satisfy the following Expression 2:

$$\theta_2 = \tfrac{1}{2}[180 - \theta_1 - \sin^{-1}\{\sin(\alpha - \theta_1)/N\}]. \quad \text{[Expression 2]}$$

wherein each light refracting portion has a top portion where the refractive surface meets the reflective surface, and a valley portion is formed between adjacent light refracting portions,
wherein, when a height from the top portion to the valley portion is a height h of the light refracting portion and a height from the top portion to a point on a normal line with respect to the valley portion of the transparent sheet where the incident light passes is H, H<h is satisfied.

10. The surface emitting device according to claim 2,
wherein each light refracting portion has a top portion where the refractive surface meets the reflective surface, and a valley portion is formed between adjacent light refracting portions, and
wherein, when a height from the top portion to the valley portion is a height h of the light refracting portion and a height from the top portion to a point on a normal line with respect to the valley portion of the transparent sheet where the incident light passes is H, H<h is satisfied.

11. The surface emitting device according to claim 7,
wherein an inclination angle $\gamma_1$ of the steep inclined plane with respect to at least one of the one surface and the opposing surface is set in the range of 20° to 90°, and an inclination angle $\gamma_2$ of the slight inclined plane with respect to at least one of one surface and the other surface is set in the range of 0.5° to 5°.

12. The surface emitting device according to claim 2,
wherein an inclination angle $\gamma_1$ of the steep inclined plane with respect to at least one of the one surface and the opposing surface is set in the range of 20° to 90°, and an inclination angle $\gamma_2$ of the slight inclined plane with respect to at least one of one surface and the other surface is set in the range of 0.5° to 5°.

13. The surface emitting device according to claim 4,
wherein an inclination angle $\gamma_1$ of the steep inclined plane with respect to at least one of the one surface and the opposing surface is set in the range of 20° to 90°, and an inclination angle $\gamma_2$ of the slight inclined plane with respect to at least one of one surface and the other surface is set in the range of 0.5° to 5°.

14. The surface emitting device according to claim 5,
wherein an inclination angle $\gamma_1$ of the steep inclined plane with respect to at least one of the one surface and the opposing surface is set in the range of 20° to 90°, and an inclination angle $\gamma_2$ of the slight inclined plane with respect to at least one of one surface and the other surface is set in the range of 0.5° to 5°.

* * * * *